US012192480B2

(12) United States Patent
Chen et al.

(10) Patent No.: US 12,192,480 B2
(45) Date of Patent: Jan. 7, 2025

(54) WEIGHT DERIVATION OF MULTIPLE REFERENCE LINE FOR INTRA PREDICTION FUSION

(71) Applicant: Tencent America LLC, Palo Alto, CA (US)

(72) Inventors: Lien-Fei Chen, Hsinchu (TW); Xin Zhao, San Jose, CA (US); Guichun Li, San Jose, CA (US); Shan Liu, San Jose, CA (US)

(73) Assignee: Tencent America LLC, Palo Alto, CA (US)

(*) Notice: Subject to any disclaimer, the term of this patent is extended or adjusted under 35 U.S.C. 154(b) by 113 days.

(21) Appl. No.: 17/984,926

(22) Filed: Nov. 10, 2022

(65) Prior Publication Data

US 2024/0022732 A1    Jan. 18, 2024

Related U.S. Application Data

(60) Provisional application No. 63/388,905, filed on Jul. 13, 2022.

(51) Int. Cl.
*H04N 19/593* (2014.01)
*H04N 19/105* (2014.01)
*H04N 19/132* (2014.01)
*H04N 19/159* (2014.01)
*H04N 19/176* (2014.01)
*H04N 19/70* (2014.01)

(52) U.S. Cl.
CPC ......... *H04N 19/159* (2014.11); *H04N 19/105* (2014.11); *H04N 19/132* (2014.11);
(Continued)

(58) Field of Classification Search
CPC .... H04N 19/105; H04N 19/11; H04N 19/132; H04N 19/159; H04N 19/176; H04N 19/593; H04N 19/70
See application file for complete search history.

(56) References Cited

U.S. PATENT DOCUMENTS

2019/0141318 A1*  5/2019  Li ........................... H04N 19/82
2019/0379891 A1* 12/2019  Moon ................. H04N 19/176
(Continued)

OTHER PUBLICATIONS

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.
(Continued)

*Primary Examiner* — Md N Haque
(74) *Attorney, Agent, or Firm* — ArentFox Schiff LLP

(57) ABSTRACT

Aspects of the disclosure provide a method and an apparatus for video decoding. The apparatus includes processing circuitry. The processing circuitry applies an intra prediction mode with a multiple reference line (MRL) prediction to a current block. For each weight candidate combination including a respective first weight candidate and a respective second weight candidate in a plurality of weight candidate combinations, a subset of samples in the current block is predicted using intra prediction fusion that is based on a first reference line weighted by the respective first weight candidate and a second reference line weighted by the respective second weight candidate. The subset of samples includes top samples in a top-most row and left samples in a left-most column. A gradient cost is determined based on the predicted subset of samples and reconstructed samples outside the current block. A weight candidate combination is selected based on the gradient costs.

20 Claims, 23 Drawing Sheets

(52) U.S. Cl.
CPC ......... *H04N 19/176* (2014.11); *H04N 19/593* (2014.11); *H04N 19/70* (2014.11)

(56) References Cited

U.S. PATENT DOCUMENTS

2022/0030226 A1* 1/2022 Lee ............... H04N 19/105
2023/0353755 A1* 11/2023 Lim ............... H04N 19/176

OTHER PUBLICATIONS

Y.-J. Chang et al., "Multiple Reference Line Coding for Most Probable Modes in Intra Prediction," 2019 Data Compression Conference (DCC), 2019, pp. 559-559, doi: 10.1109/DCC.2019.00071.

B. Bross et al., CE3: Multiple reference line intra prediction (Test 1.1.1, 1.1.2, 1.1.3 and 1.1.4), document JVET-L0283 of JVET, Oct. 2018, pp. 1-7.

ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-516.

M. Coban, et al., "Algorithm description of Enhanced Compression Model 5 (ECM5)", ISO/IEC JTC1/SC29/WG5 JVET-Z2025, Apr. 2022, pp. 1-45.

K. Cao, V. Seregin, and M. Karczewicz, "Non-EE2: Intra Prediction Fusion", ISO/IEC JTC1/SC29/WG5 JVET-AA0137, Jul. 2022, pp. 1-3.

* cited by examiner

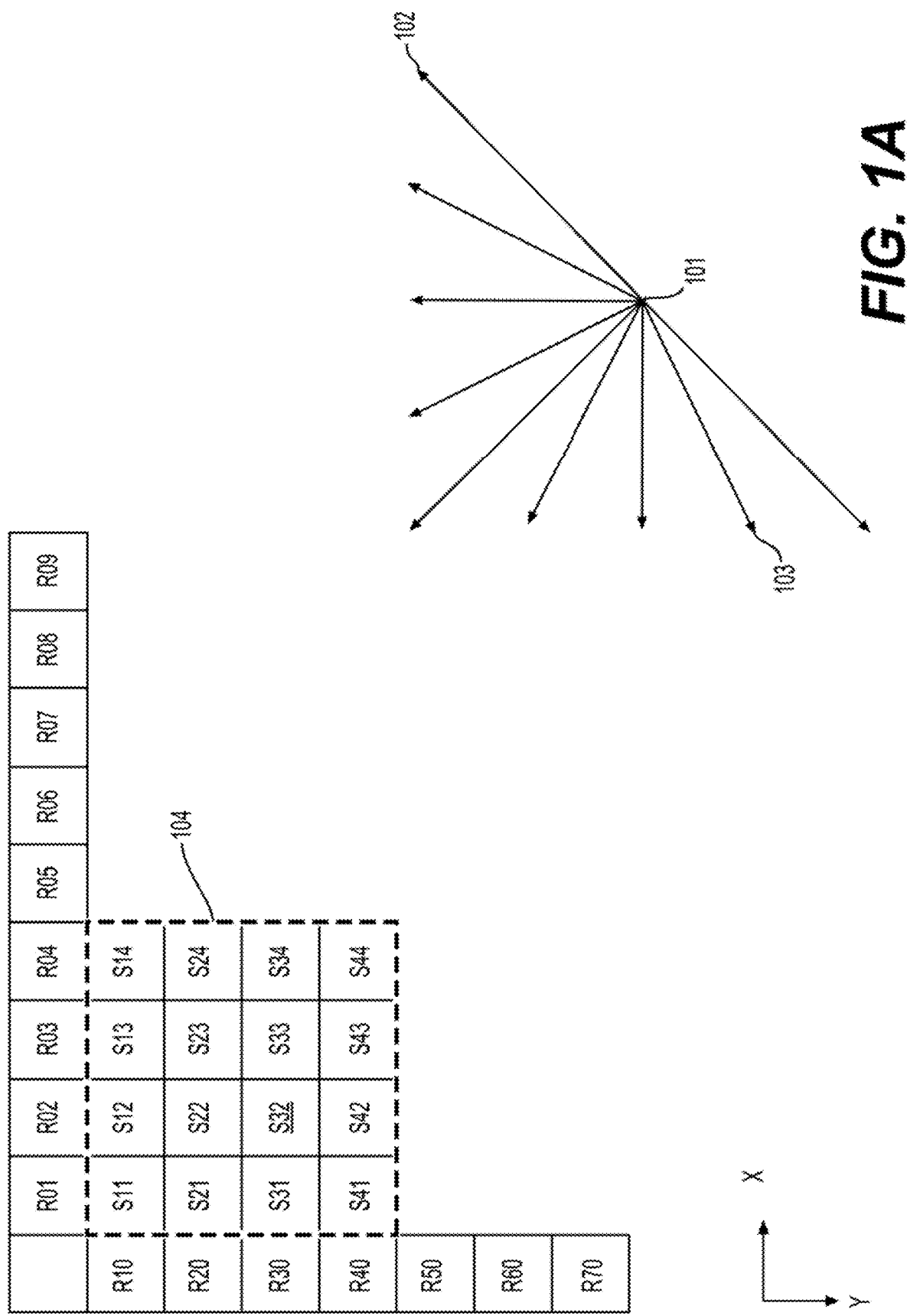

WEIGHT DERIVATION OF MULTIPLE REFERENCE LINE FOR INTRA PREDICTION FUSION

INCORPORATION BY REFERENCE

The present application claims the benefit of priority to U.S. Provisional Application No. 63/388,905, "ON THE WEIGHT DERIVATION OF MULTIPLE REFERENCE LINE FOR INTRA PREDICTION FUSION" filed on Jul. 13, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions.
Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video/image encoding and/or decoding. In some examples, an apparatus for video/image decoding includes processing circuitry. The processing circuitry decodes prediction information of a current block in a current picture from a coded bitstream. The prediction information indicates an intra prediction mode with a multiple reference line (MRL) prediction being applied to the current block. The current block is predicted based on a first reference line and a second reference line. Each piece of weight information in multiple pieces of weight information indicates a respective first weight candidate for the first reference line and a respective second weight candidate for the second reference line. For each piece of weight information, the processing circuitry predicts a subset of samples in the current block using intra prediction fusion that is based on the first reference line, the second reference line, and the respective piece of weight information. The subset of samples includes at least one of (i) top samples in a top row (also referred to as a top-most row) in the current block or (ii) left samples in a left-most column in the current block. The processing circuitry determines a gradient cost based on the predicted subset of samples in the current block and reconstructed samples outside the current block. The reconstructed samples outside the current block include samples that neighbor the predicted subset of samples in the current block. The processing circuitry selects a piece of weight information from among the multiple pieces of weight information based on the determined gradient costs corresponding to each of the multiple pieces of weight information. The selected piece of weight information indicates a first weight for the first reference line and a second weight for the second reference line.

In an example, the first reference line includes first reference samples that are N1 rows or N1 columns away from the current block. The second reference line includes second reference samples that are N2 rows or N2 columns away from the current block. N1 and N2 are different integers that are larger than or equal to 0.

In an example, for each piece of weight information in the multiple pieces of weight information and for one of the subset of samples, the processing circuitry determines a first prediction value based on one or more first reference samples of the first reference line using the intra prediction mode. The processing circuitry determines a second prediction value based on one or more second reference samples of the second reference line using the intra prediction mode. The processing circuitry predicts the one of the subset of samples based on the first prediction value modified by the first weight, the second prediction value modified by the second weight, and a residual of the one of the subset of samples.

In an example, the subset of samples in the current block includes the top samples in the top row in the current block and the left samples in the left-most column in the current block.

In an example, the reconstructed samples outside the current block include reconstructed samples that are not adjacent to the predicted subset of samples.

The processing circuitry can determine the piece of weight information to be one of the multiple pieces of weight information that corresponds to the smallest gradient cost in the determined gradient costs.

In an example, the processing circuitry reorders the multiple pieces of weight information based on the determined gradient costs and determines the piece of weight information based on an index and the reordered multiple pieces of weight information.

The index can be signaled in a high-level syntax.

In an embodiment, the processing circuitry receives a coded bitstream comprising a current block in a current picture. The processing circuitry obtains and decodes, from the coded bitstream, prediction information indicating whether an intra prediction mode with a multiple reference line (MRL) prediction is applied to the current block. The current block is predicted based on a first reference line and a second reference line, wherein a first weight candidate is applied to the first reference line and a second weight candidate is applied to the second reference line. The processing circuitry obtains from the coded bitstream a plurality of weight candidate combinations. Each weight candidate combination includes the respective first weight candidate and the respective second weight candidate. For each weight candidate combination, the processing circuitry predicts a subset of samples in the current block using intra prediction fusion that is based on the first reference line weighted by the respective first weight candidate and the second reference line weighted by the respective second weight candidate, wherein the subset of samples includes (i) top samples in a top-most row in the current block and (ii) left samples in a left-most column in the current block. The processing circuitry determines a gradient cost based on the predicted subset of samples in the current block and reconstructed samples outside the current block. The reconstructed samples outside the current block including samples that neighbor the predicted subset of samples in the current block. The processing circuitry selects a weight candidate combination based on the determined gradient cost corresponding to each weight candidate combination.

In an embodiment, the processing circuitry receives an MRL index i from the coded bitstream indicating that an ith entry in a MRL list corresponds to a first reference line. The processing circuitry determines that an (i+1)th entry in the MRL list corresponds to a second reference line and reconstructs a sample in the current block using intra prediction fusion that is based on multiple reference lines of the current block. In an example, the first reference line and second reference line in the multiple reference lines are not spatially adjacent.

In an example, the processing circuitry determines a first prediction value based on one or more first reference samples in the first reference line using the intra prediction mode. The processing circuitry determines a second prediction value based on one or more second reference samples in the second reference line using the intra prediction mode. The processing circuitry predicts the sample based on a weighted average of the first prediction value and the second prediction value.

In an example, the processing circuitry reconstructs the sample based on the predicted sample and a residual of the sample.

In an example, the MRL list is {1, 3, 5, 7, 12} corresponding to reference lines 1, 3, 5, 7, and 12, respectively. Each of the reference lines 1, 3, 5, 7, and 12 is 1, 3, 5, 7, and 12 rows and/or columns away from the current block, respectively. The MRL index i being 0, 2, 3, or 4 corresponds to the reference line 1, 5, 7, or 12, respectively. If the MRL index i is 0, the first reference line and the second reference line are the reference lines 1 and 3. If the MRL index i is 2, the first reference line and the second reference line are the reference lines 5 and 7. If the MRL index i is 3, the first reference line and the second reference line are the reference lines 7 and 12. If the MRL index i is 4, the first reference line and the second reference line are the reference lines 12 and 1.

In an example, a first weight associated with the first reference line and a second weight associated with the second reference line depend on the first reference line and the second reference line. The sample in the current block can be reconstructed based on the first reference line, the second reference line, the first weight, and the second weight.

In an example, a first weight associated with the first reference line and a second weight associated with the second reference line depend on a distance between the first reference line and the second reference line. The distance can be a number of rows and/or columns between the first reference line and the second reference line.

In an example, a first weight associated with the first reference line depends on a distance between the first reference line and a reference line 0 that is adjacent to the current block. The distance is proportional to the MRL index i.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

DETAILED DESCRIPTION OF EMBODIMENTS

Figure 3:
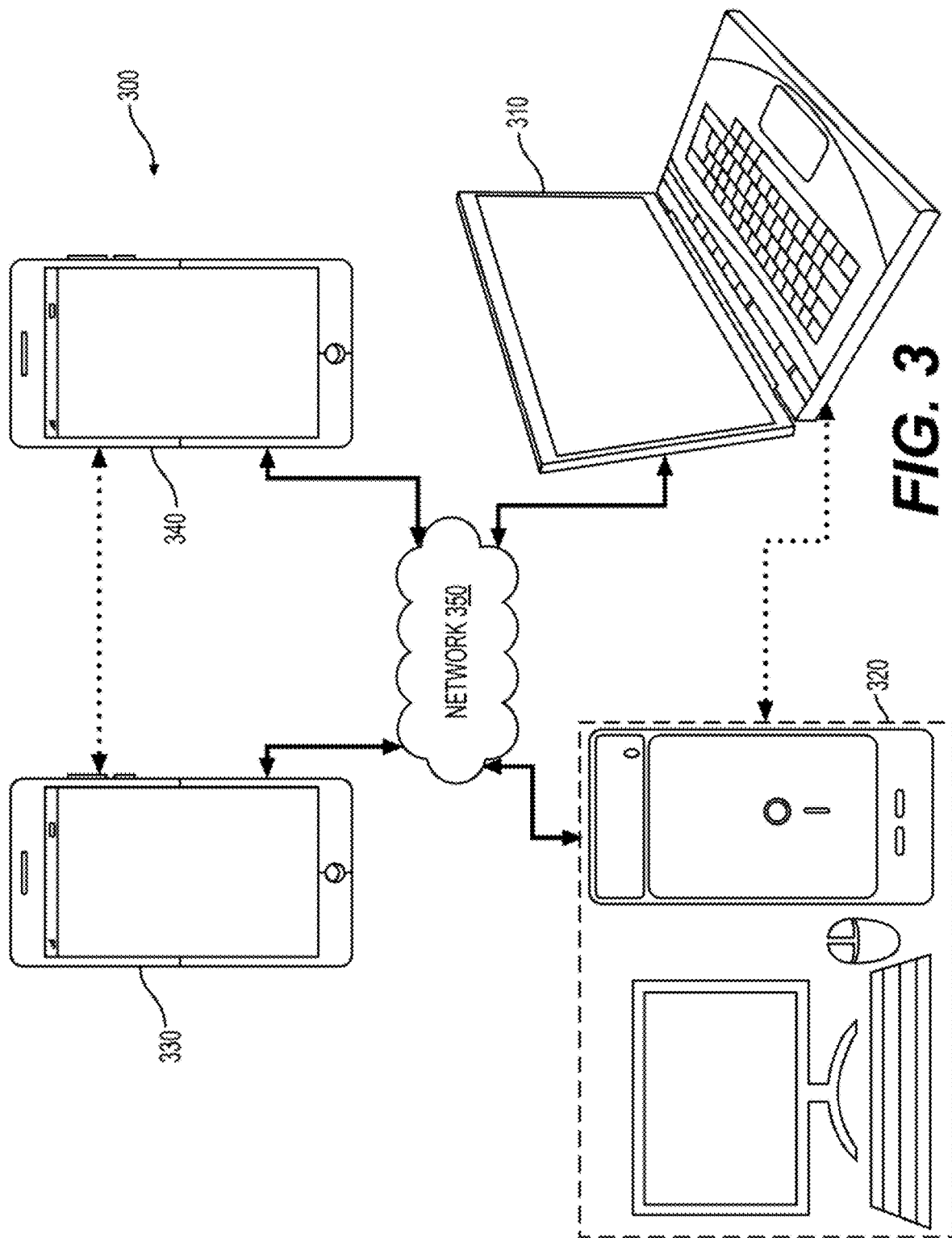
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
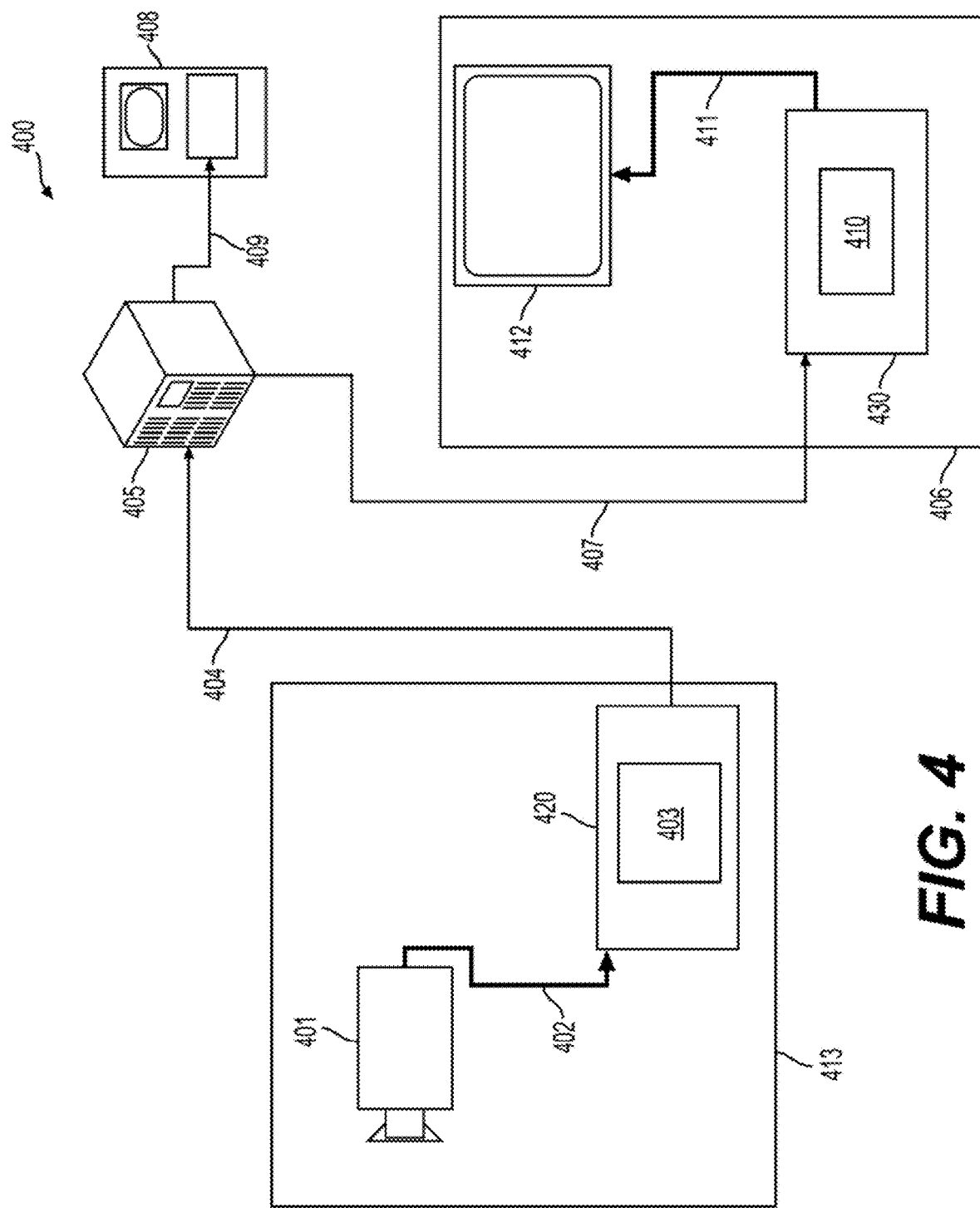
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
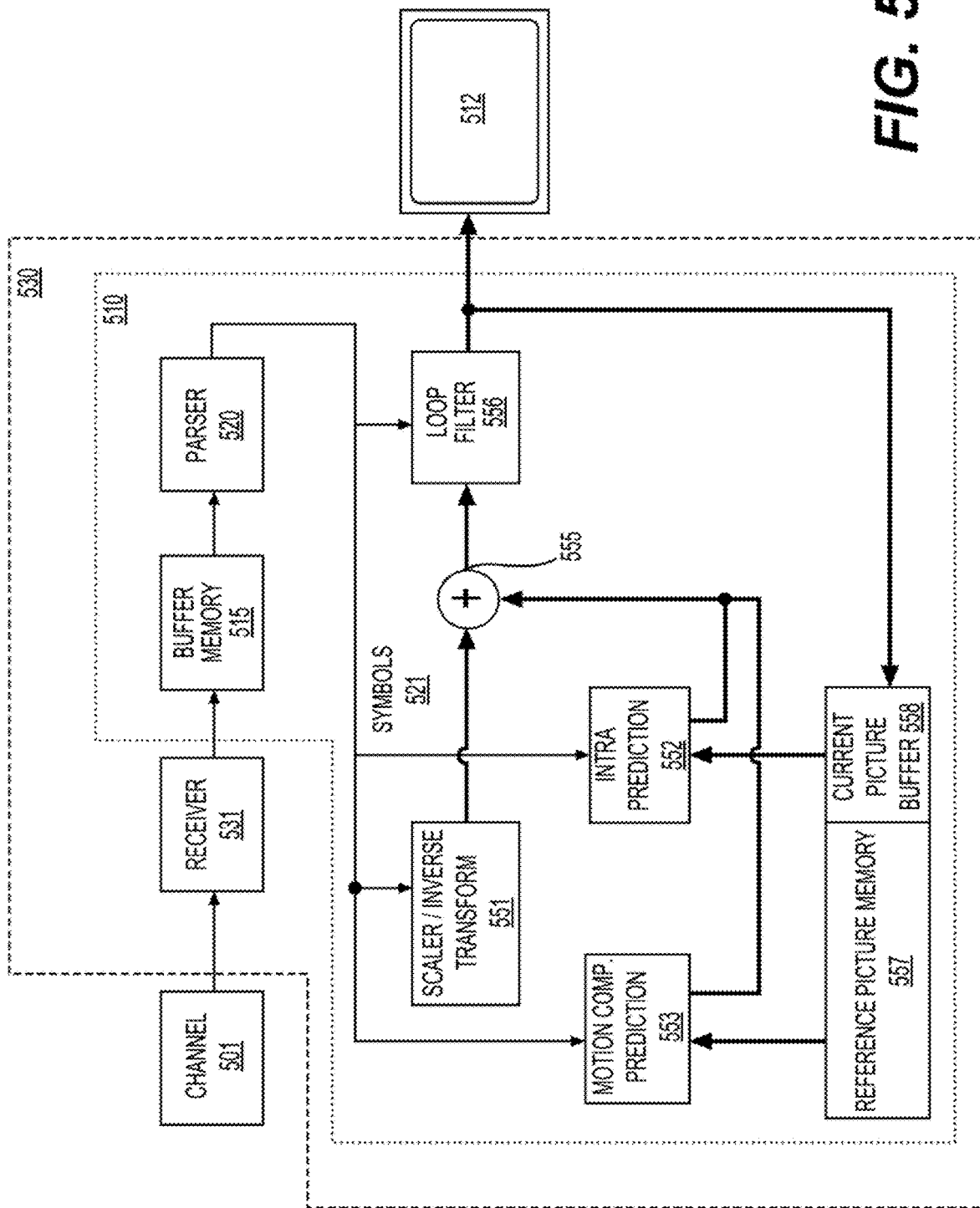
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
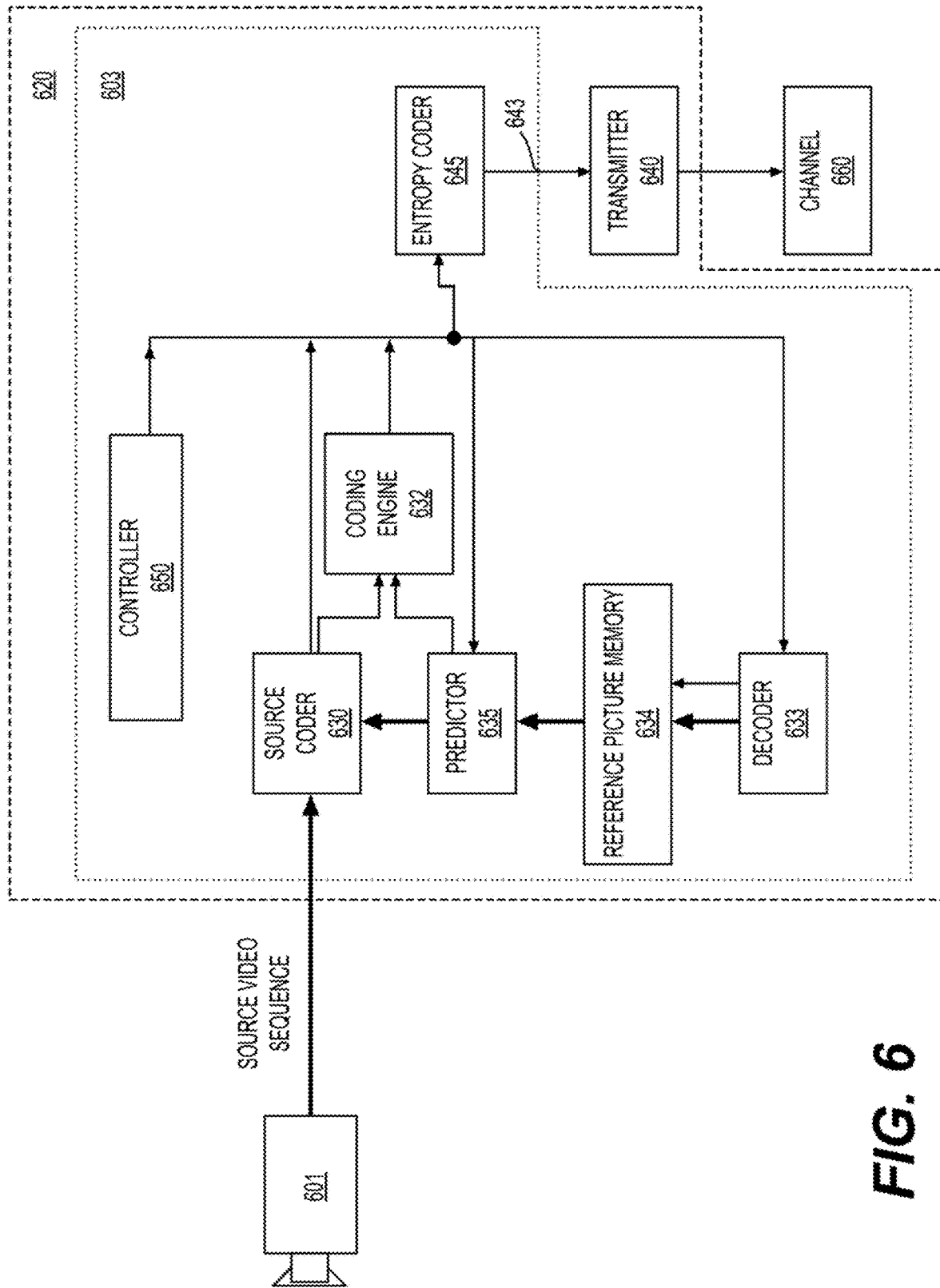
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
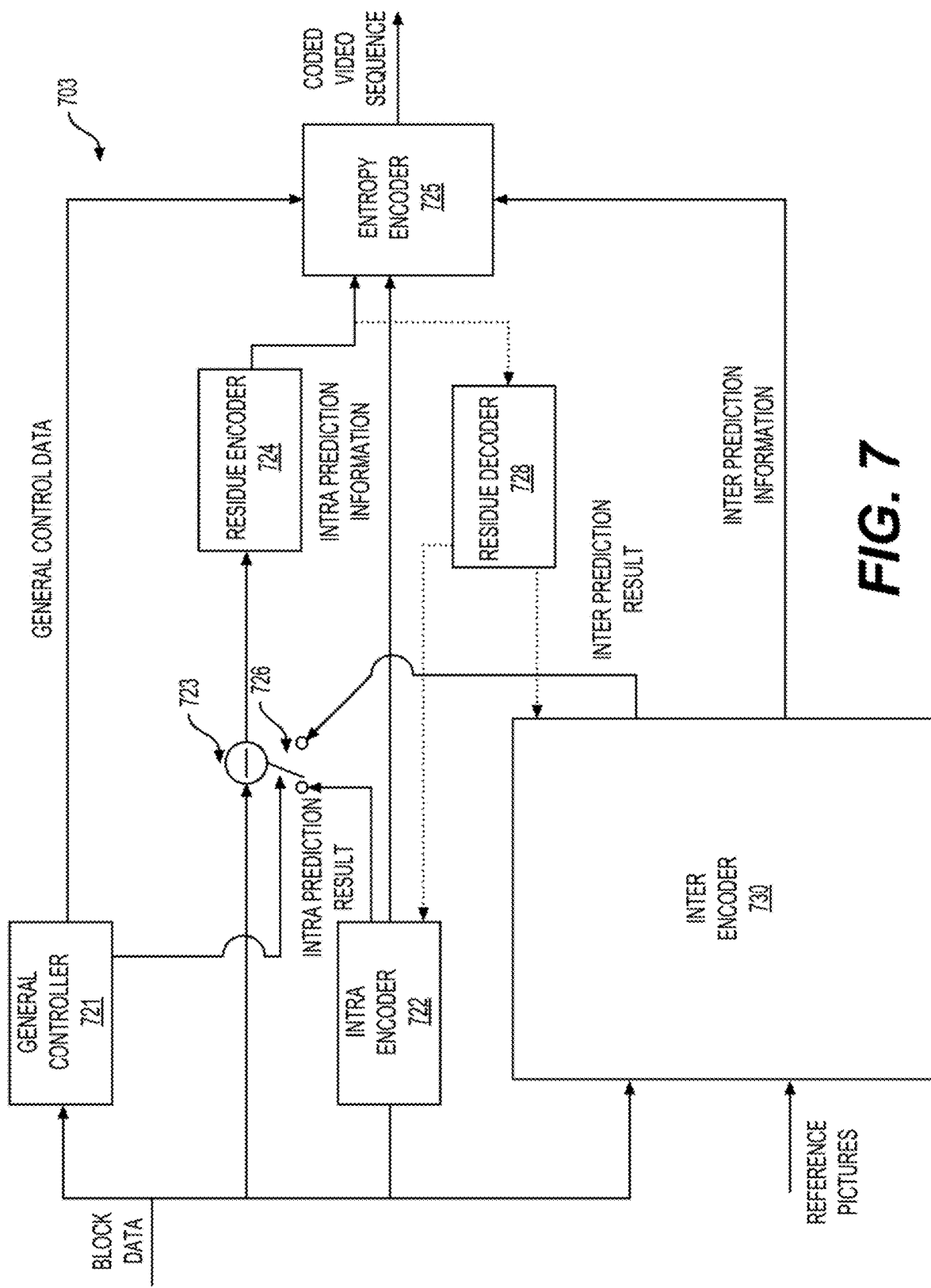
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
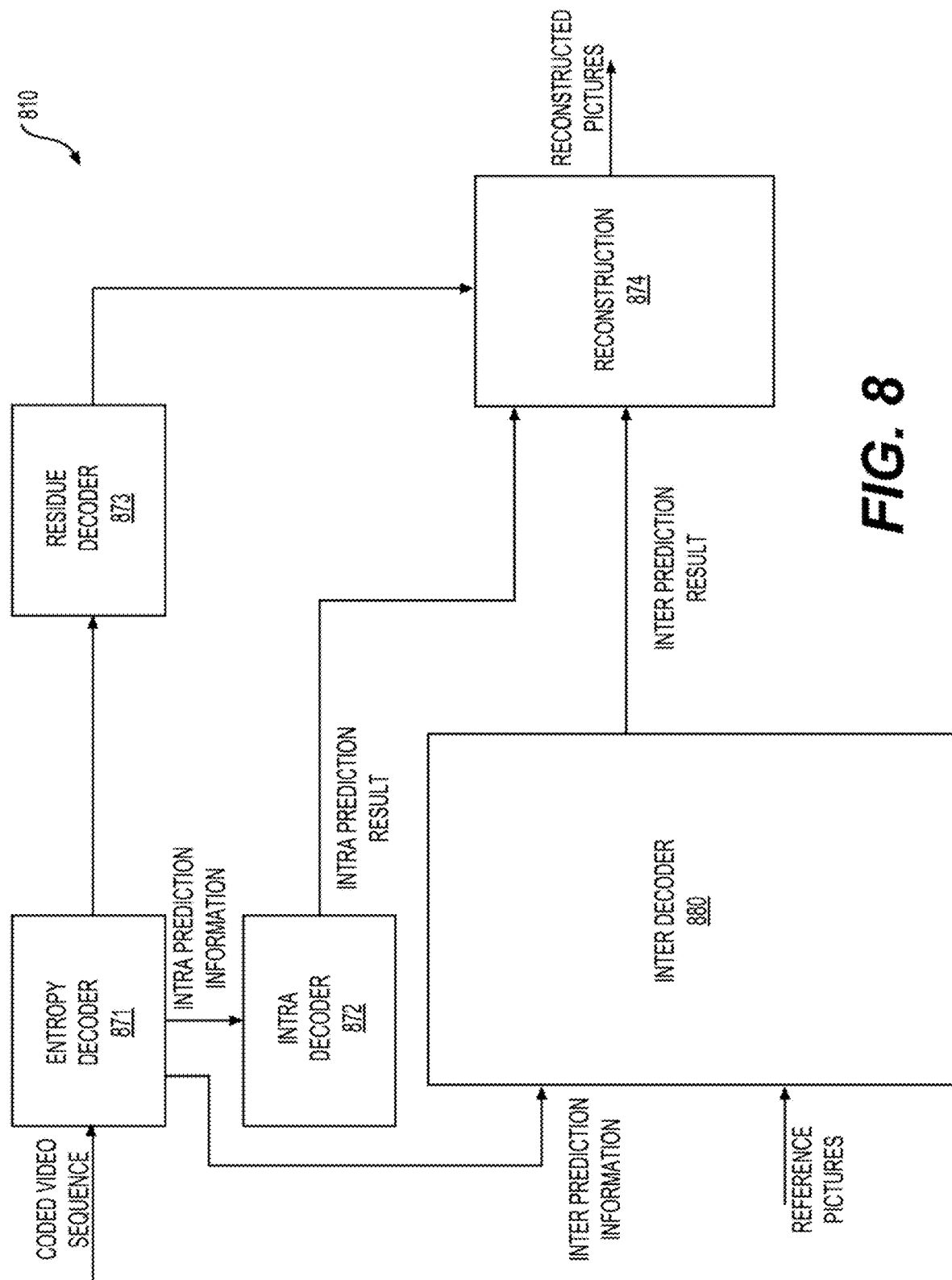
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in detail below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
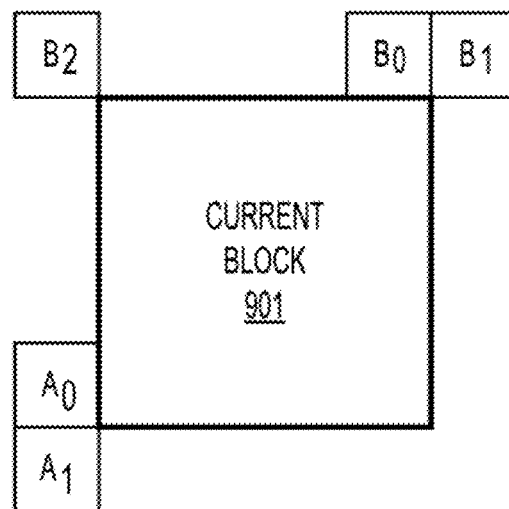
FIG. 9 shows positions of spatial merge candidates according to an embodiment of the disclosure.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, B0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

Figure 10:
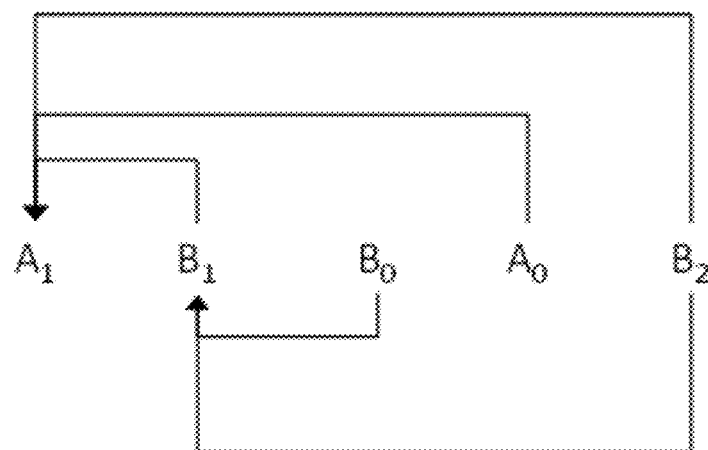
FIG. 10 shows candidate pairs that are considered for a redundancy check of spatial merge candidates according to an embodiment of the disclosure.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
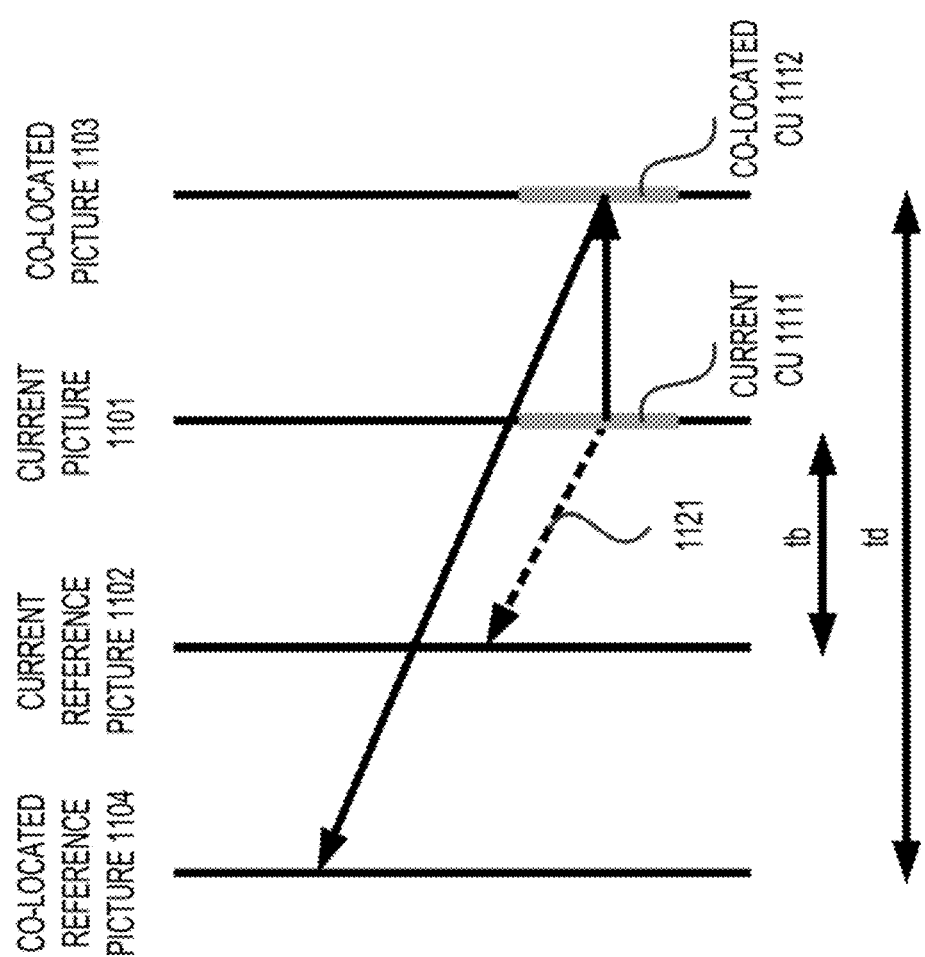
FIG. 11 shows exemplary motion vector scaling for a temporal merge candidate.

In an embodiment, temporal candidate(s) are derived as follows. In an example, only one temporal merge candidate is added to the candidate list. FIG. 11 shows exemplary motion vector scaling for a temporal merge candidate. To derive the temporal merge candidate of a current CU (1111) in a current picture (1101), a scaled MV (1121) (e.g., shown by a dotted line in FIG. 11) can be derived based on a co-located CU (1112) belonging to a co-located reference picture (1104). A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined to be the POC difference between a current reference picture (1102) of the current picture (1101) and the current picture (1101). The POC distance td can be defined to be the POC difference between the co-located reference picture (1104) of the co-located picture (1103) and the co-located picture (1103). A reference picture index of the temporal merge candidate can be set to zero.

Figure 12:
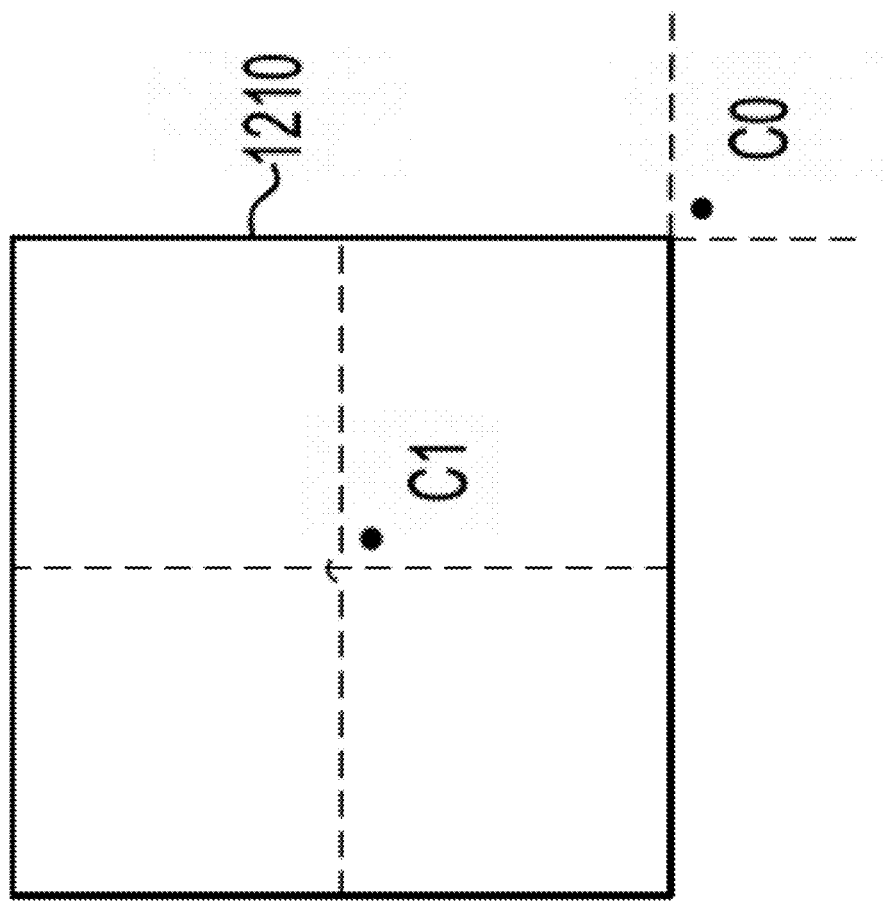
FIG. 12 shows exemplary candidate positions for a temporal merge candidate of a current coding unit.

FIG. 12 shows exemplary candidate positions (e.g., C0 and C1) for a temporal merge candidate of a current CU. A position for the temporal merge candidate can be selected between the candidate positions C0 and C1. The candidate position C0 is located at a bottom-right corner of a co-located CU (1210) of the current CU. The candidate position C1 is located at a center of the co-located CU (1210) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

In some examples, such as in VVC, a quadtree with nested multi-type tree (QTMTT) structure is used to allow more flexibility in CTU partitioning. In the QTMTT structure, a CTU can be partitioned through a recursive quadtree (QT) and multi-type tree (MTT) partitioning structure. The QT structure can use the same concept, for example, employed in HEVC, where a current CU can be split into four smaller quadratic CUs. The MTT structure can partition a CU (e.g., a CU with a rectangular shape) through a binary tree (BT) and a ternary tree (TT). The BT partitioning can split the current CU into two symmetric partitions. The TT partitioning can split the current CU into three partitions, and the three partitions can include a central partition and two side partitions having ½ and ¼ of an original CU size, respectively. For intra slices, such as in VVC, dual-tree partition is allowed where the luminance and chrominance components in a CTU can be partitioned differently. In an example, such as in VVC, the intra prediction of luminance samples can be performed with rectangular CU sizes ranging from 4×4 to 64×64. Various intra prediction coding tools are introduced to improve the encoding efficiency, including but not limited to: angular intra prediction with 65 angles and 4-tp interpolation filters, wide-angle intra prediction (WAIP), position dependent prediction combination (PDPC), multiple reference line (MRL) prediction, an intra subpartition (ISP) Mode, matrix-based intra prediction (MIP), a cross component linear model (CCLM), intra mode coding with 6 most probable modes (MPMs), and/or the like.

Figure 13A:
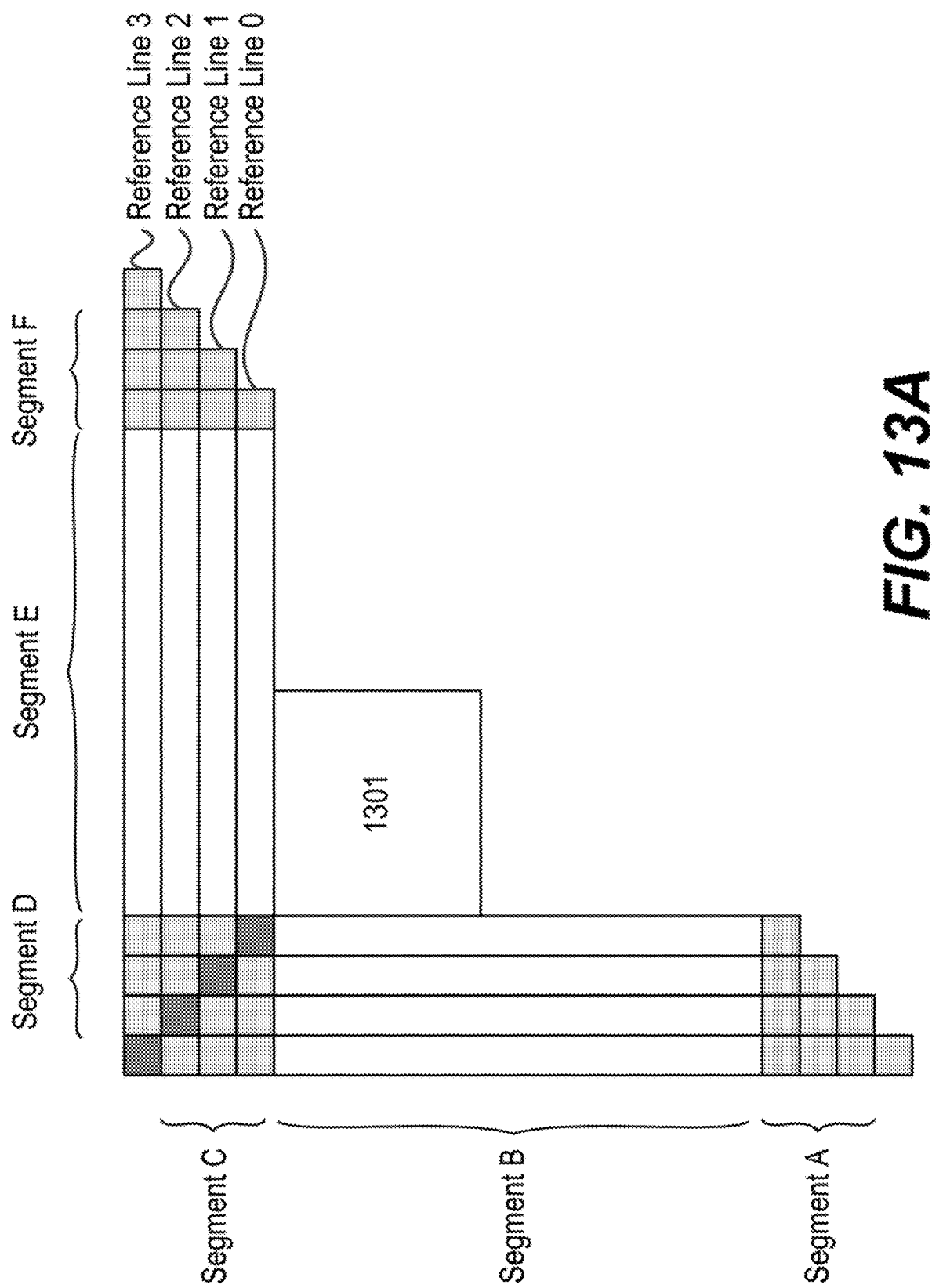
FIG. 13A shows an example of multiple reference line (MRL) intra prediction.

The MRL intra prediction can use multiple reference lines for intra prediction. FIG. 13A shows an example of the MRL intra prediction. Four reference lines 0-3 of a current block (1301) are shown in FIG. 13A. The reference line i can include reference samples that are i lines away from the current block (1301), for example, i lines away from boundaries (e.g., i rows away from a top boundary and/or i columns away from a left boundary) of the current block (1301) where i is 0, 1, 2, or 3. For example, the reference line i includes reference samples that are i rows above the top boundary of the current block (1301) and/or i columns to the left of the left boundary of the current block (1301). In an example, the reference line 0 includes reference samples that are adjacent to the current block (1301), such as reconstructed neighboring samples including top neighboring samples that are above the current block (1301) and left neighboring samples that are to the left of the block (1301). In an example, the reference line 0 can include a top-left reconstructed neighboring sample.

The reference lines 0-3 can include multiple segments, such as segments A-F. In an example, samples of the segments A and F are not fetched from reconstructed neighboring samples. The samples of the segments A and F can be padded (or filled) with the closest samples from the segments B and E, respectively.

In an example, such as in HEVC, the nearest reference line (i.e., reference line 0) is used in intra prediction (or intra-picture prediction). In the MRL intra prediction, multiple reference lines can be used. In an example, two additional lines (e.g., the reference line 1 and the reference line 3) are used.

An index (e.g., a reference line index denoted as mrl_idx) used to select reference line(s) can be signaled and the selected reference line(s) can be used to generate an intra predictor for the current block (1301). For the reference line index that is greater than 0, only additional reference line modes can be included in an MPM list and only an MPM index without remaining mode (e.g., the intra prediction modes that are not included in the MPM list) can be signaled. The index can be signaled before intra prediction modes. In an example, certain intra prediction modes (e.g., the planar mode and/or the DC mode) are excluded from intra prediction modes when a nonzero reference line index is signaled.

Figure 13B:
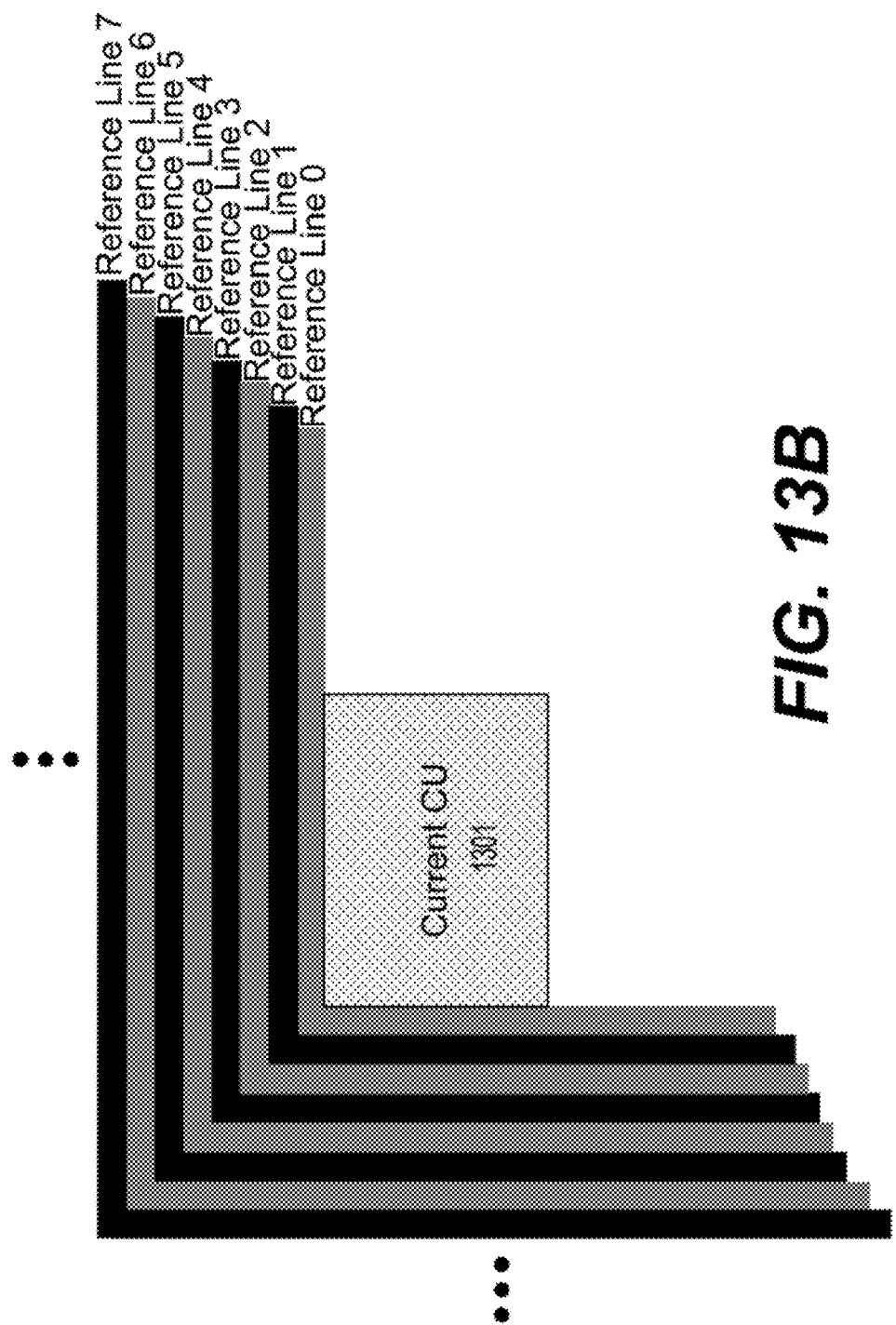
FIG. 13B shows an example of multiple reference lines used in an MRL intra prediction.

The MRL intra prediction can be extended, for example, in Enhanced Compression Model 5 (ECM5), to include more reference lines for intra prediction. FIG. 13B shows an example of multiple reference lines used in the MRL intra prediction. Reference lines 0-7 of reference lines 0-12 are shown for the current block (1301). The reference lines 0-3 in FIG. 13B are described in FIG. 13A. The description of the reference lines 0-3 can be adapted to the reference lines 4-12 where reference samples in the reference line i are i lines away from the current block (1400), as described in FIG. 13A, where i can be from 4 to 12. The MRL intra prediction can use less or more reference lines than the reference lines 0-12. The MRL intra prediction can use spatially adjacent reference lines (e.g., the reference lines 1 and 2) and/or spatially non-adjacent reference lines (e.g., the reference lines 1 and 3).

An MRL list, such as an extended reference line list, can include indices (e.g., mrl_idx) of reference lines. In an example, an extended reference line list includes one or more reference lines that are different from the reference lines 0-3 shown in FIG. 13B. In an example, the MRL list is $\{1, 3, 5, 7, 12\}$ where the indices 1, 3, 5, 7, and 12 indicate the reference lines 1, 3, 5, 7, and 12, respectively. The MRL list of $\{1, 3, 5, 7, 12\}$ is an extended reference line list.

Template-based intra mode derivation (TIMD) can use reference samples of a current CU as a template and choose a best intra mode among a set of candidate intra prediction modes that is associated with the TIMD. In the TIMD, instead of the full MRL list (e.g., $\{1, 3, 5, 7, 12\}$), a subset of the full MRL list is used. In an example, the first two reference line candidates, e.g., $\{1, 3\}$, are used.

In intra prediction or an intra prediction mode, sample values of a coding block can be predicted from samples that are already reconstructed (referred to as reference samples). The samples can be in one or more reference lines.

An example of intra prediction is a planar mode that can use a bi-linear interpolation. In the planar mode, one or more positions in the current block can be predicted using reference samples in a reference line. Other positions in the current block can be predicted as a linear combination of sample(s) at the one or more positions and the reference samples. Weights may be determined according to a location of a current sample in the current block.

An example of intra prediction is a DC mode. To predict a sample in a block with the DC mode, an average of samples in a reference line can be used as the predictor.

An example of intra prediction is angular intra prediction. In the angular intra prediction, a current sample in a current block can be predicted using a reference sample (e.g., a prediction sample) or an interpolated reference sample, for example, in a reference line.

Figure 14:
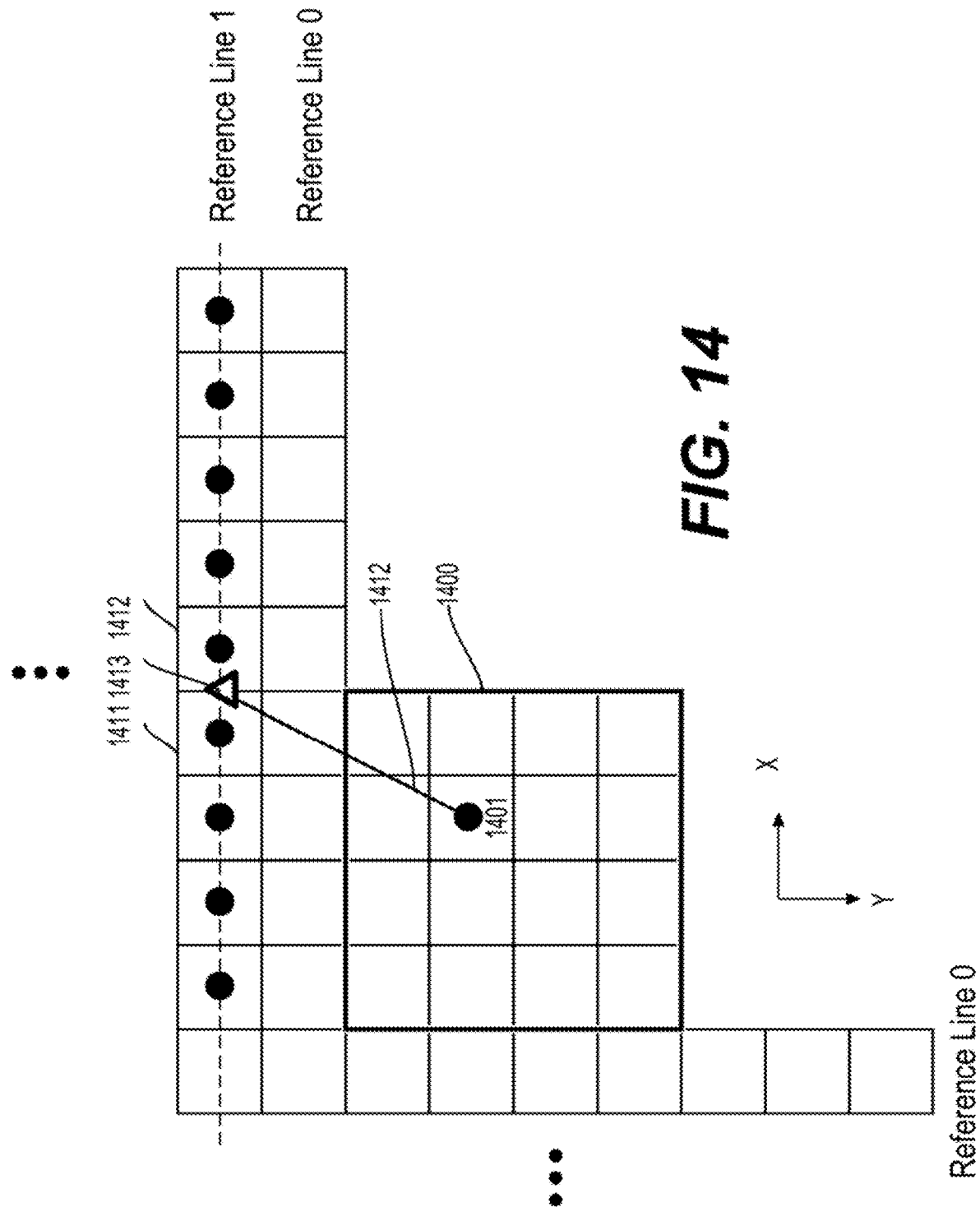
FIG. 14 shows an example of intra prediction using a reference line.

FIG. 14 shows an example of intra prediction using a reference line. The reference line can be the reference line 0 adjacent to a block (1400) or a reference line (e.g., the reference line 1) that is non-adjacent to the block (1400). A portion of the reference lines 0-1 are shown. A sample (1401) in the block (1400) is predicted using one or more samples of the reference line 1 with an intra predictor direction (or an angular direction) (1412). The sample (1401) is projected to the reference line 1 along the angular direction (1412).

In the example shown in FIG. 14, a projected position (1413) of the sample (1401) is located between two reference samples (1411)-(1412) of the reference line 1, and is referred to as a projected fractional position. The two reference samples (1411)-(1412) of the reference line 1 can be used to predict the sample (1401). An interpolation filter, such as a two-tap linear interpolation filter, can be used to generate a prediction of the sample (1401). A filter coefficient can be an inverse proportion of two distances between the projected fractional position (1413) and the two adjacent integer positions (indicated by black dots) of the two reference samples (1411)-(1412), respectively.

In an example, a projected position of the sample (1401) is located at an integer position of a reference sample of the reference line 1. Thus, the reference sample of the reference line 1 is used as the prediction of the sample (1401), and no interpolation is needed.

Intra prediction fusion can be used to determine an intra predicted sample of a sample in a block using two reference lines (e.g., a first reference line and a second reference line), such as shown in Eq. 1.

$$p_{fusion} = w_0 p_{line} + w_1 p_{line+1} \qquad \text{Eq. 1}$$

A parameter $p_{line}$ represents a first prediction based on the first reference line and a parameter $p_{line+1}$ represents a second prediction based on the second reference line. Each of the first prediction and the second prediction can be predicted using an intra prediction mode and a respective reference line, such as an angular intra prediction shown in FIG. 14. In the example shown in Eq. 1, the two reference lines (e.g., the first reference line and the second reference line) are spatially adjacent to each other, such as the reference lines 1-2. The two intra predictions obtained from the respective reference lines are weighted using weights $w_0$ and $w_1$ for the first reference line and the second reference line, respectively.

In an example, the first reference line is a default reference line and the second reference line is the reference line above the default reference line. In an example, the weights $w_0$ and $w_1$ are set as ¾ and ¼, respectively.

The intra prediction fusion can be applied to luma blocks. In an example, the intra prediction fusion is applied to a luma block when an angular intra mode has a non-integer slope and a block size (e.g., a number of samples in the luma block) is greater than 16. In an example, the intra prediction fusion is used with the MRL intra prediction. In an example, the intra prediction fusion is not applied to ISP coded blocks.

Fixed weights are used in the intra prediction fusion with multiple reference lines, as described above. In some examples, the fixed weights may not have good coding efficiency. In the example shown in Eq. 1, reference samples of the two spatially adjacent reference lines are stored in a buffer. For example, the extra line buffer requirement of the MRL for the intra prediction fusion is twice a size of the MRL in some embodiments, such as in ECM5. For example, the MRL list is {1, 3, 5, 7, 12} where samples of the reference lines 1, 3, 5, 7, and 12 are saved. To use the intra prediction fusion in Eq. 1, respective adjacent lines including 2, 4, 6, and/or 8 may be stored, and thus increasing the buffer requirement of the MRL.

The disclosure describes embodiments related to weight combination derivation of MRL for intra prediction fusion and multiple reference line selection methods for intra prediction fusion.

Figure 1B:
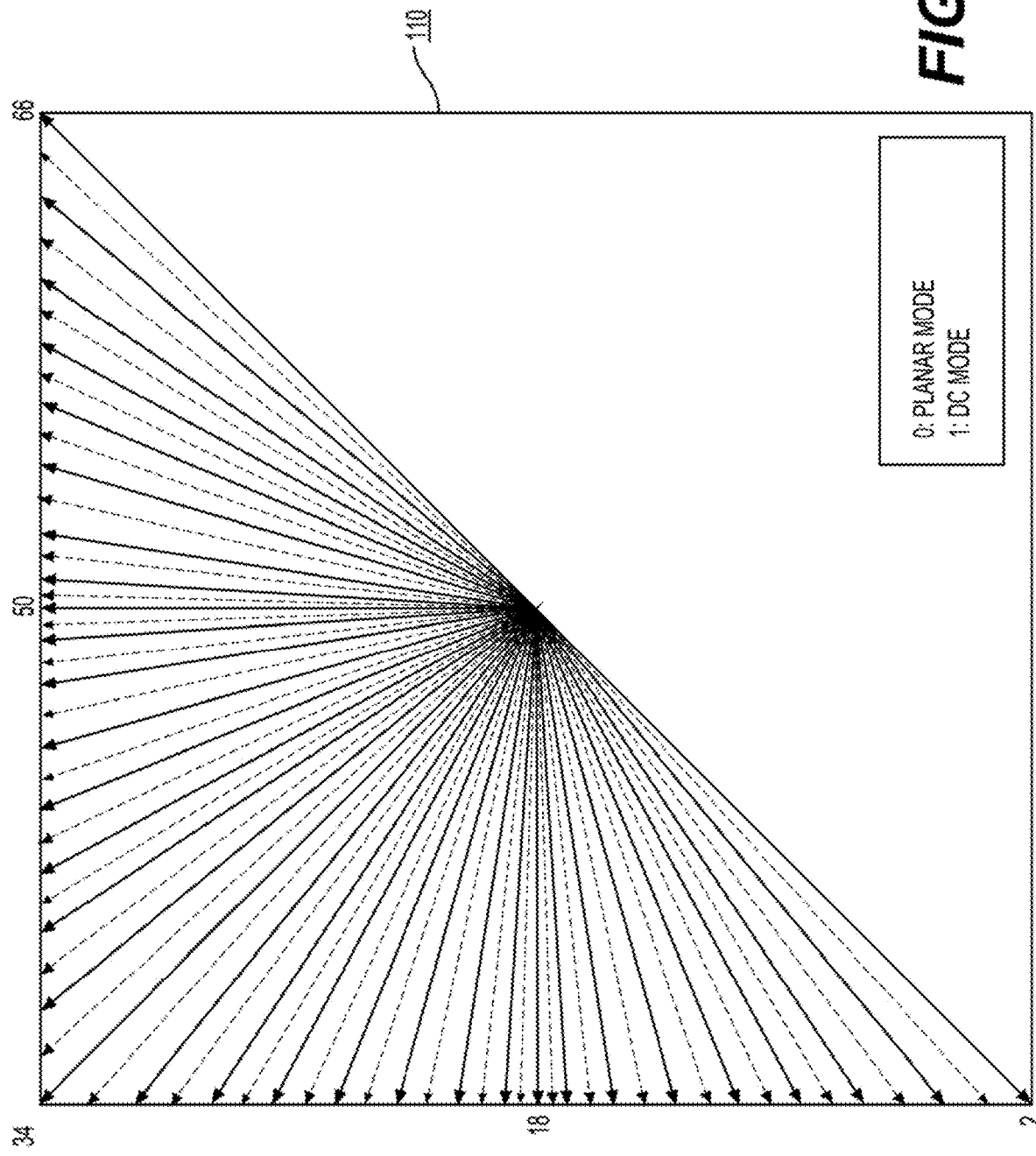
FIG. 1B is an illustration of exemplary intra prediction directions.
Figure 2:
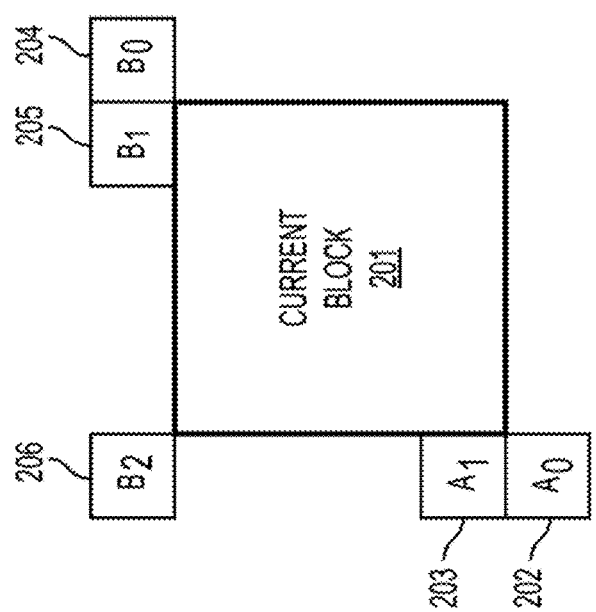
FIG. 2 is a schematic illustration of a current block and its surrounding spatial merge candidates in one example.
Figure 15:
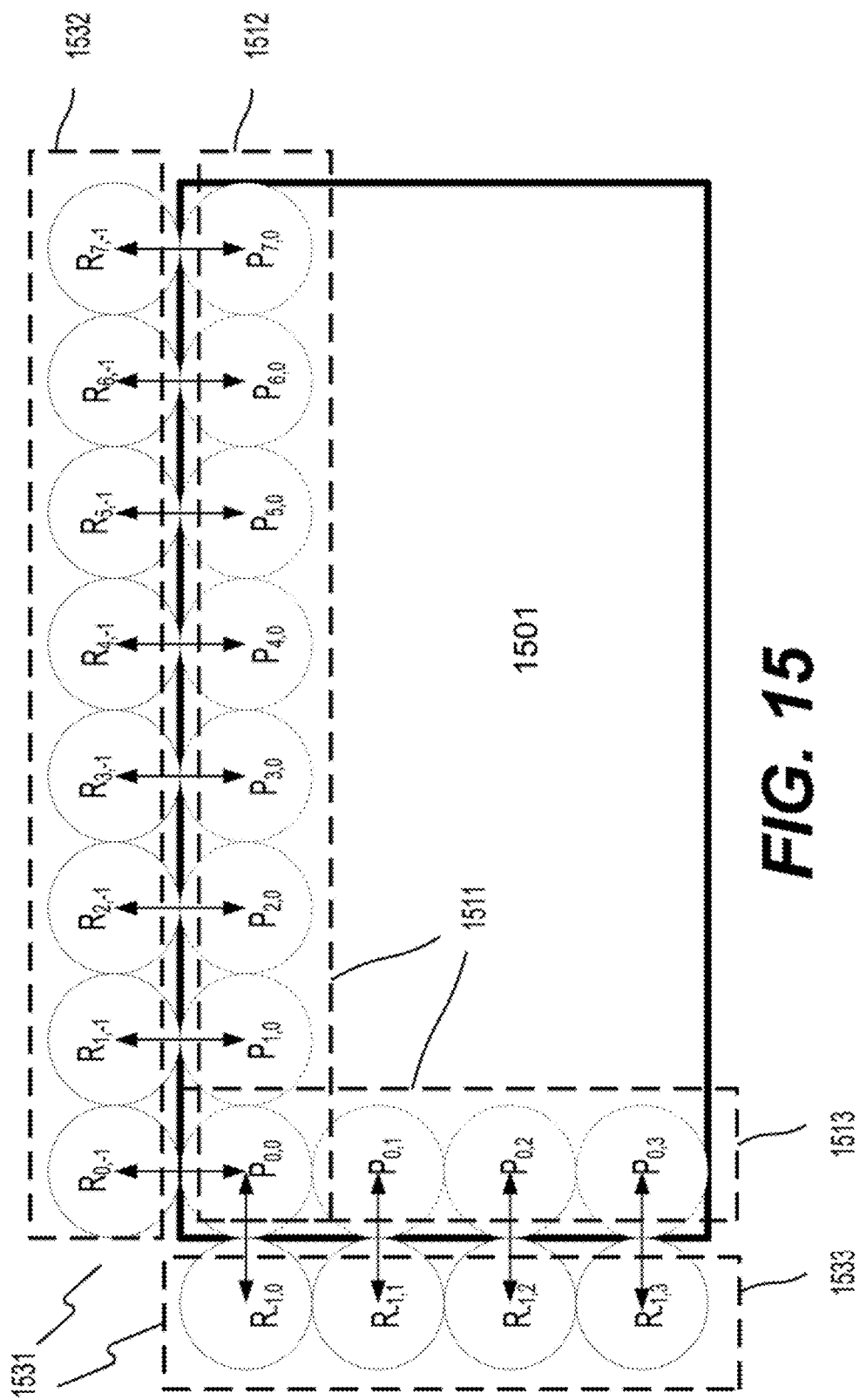
FIG. 15 shows an example of samples used to determine a gradient cost for a current block.

Referring to FIG. 15, a current block (1501) is predicted with an intra prediction mode (e.g., an angular intra prediction mode, such as described in FIGS. 1A-1B and FIG. 14). According to an embodiment of the disclosure, multiple reference lines can be used to predict a sample in the current block (1501) using the intra prediction fusion with adaptive weights. Based on the adaptive weights, a weighted average of individual predictions based on the multiple reference lines can be used to predict the sample. Each individual prediction can be based on the intra prediction mode using a reference line. The weights can be adapted based on a gradient or a difference between (i) intra predicted samples in the current block and (ii) reconstructed samples outside the current block. In an example, the intra predicted samples in the current block and the reconstructed samples outside the current block are near boundaries of the current block. In an example, two of the multiple reference lines are not spatially adjacent.

In an embodiment, two reference lines (e.g., a first reference line and a second reference line) are used in the intra prediction fusion. Multiple pieces of weight information are available for the current block. In an example, the multiple pieces of weight information include a plurality of weight candidate combinations. Each piece of weight information in the multiple pieces of weight information can indicate a first weight (also referred to as a first weight candidate) (e.g., $w_0$) and a second weight (also referred to as a second weight candidate) (e.g., $w_1$) of the first reference line and the second reference line of the current block, respectively. Each piece of weight information can indicate a weight candidate combination, such as a respective first weight candidate and a respective second weight candidate. In an example, the first weight and the second weight are related, for example, a sum of the first weight and the second weight is 1. Accordingly, when one of the first weight and the second weight is known, another of the first weight and the second weight is also known.

For each piece of weight information in the multiple pieces of weight information, a subset of samples (1511) in the current block (1501) can be predicted using the intra prediction fusion, for example, based on the first reference line, the second reference line, and the respective piece of weight information, such as described in Eq. 2.

$$p_{fusion} = w_0 p_1 + w_1 p_2 \qquad \text{Eq. 2}$$

A parameter $p_1$ represents a first prediction based on the first reference line and a parameter $p_2$ represents a second prediction based on the second reference line. In an example, the first reference line (e.g., the reference line 1) and the second reference line (e.g., the reference line 3) are not adjacent, which is different from Eq. 1. Each of the first prediction and the second prediction can be predicted using an intra prediction mode and a respective reference line, such as an angular intra prediction shown in FIG. 14. The weights $w_0$ and $w_1$ for the first reference line and the second reference line, respectively, are described with reference to Eq. 1.

In an example, residual data of the subset of samples (1511) are added to the predicted subset of samples (1511) to determine the reconstructed subset of samples (1511). The subset of samples (1511) can include (i) top samples (1512) in a top row (also referred to as a top-most row) in the current block (1501) and/or (ii) left samples (1513) in a left-most column in the current block (1501).

A gradient cost can be determined based on the reconstructed subset of samples (1511) in the current block and neighboring reconstructed samples (1531) of the current block (1501) that correspond to the reconstructed subset of samples (1511). The neighboring reconstructed samples (1531) can include (i) top neighboring samples (1532) and/or (ii) left neighboring samples (1533). In an example, the neighboring reconstructed samples (1531) are reference samples of the reference line 0.

In an example, the gradient cost is determined using Eq. 3.

$$\text{gradient cost} = \Sigma_{m=0}^{W-1} |r_{m,-1} - p_{m,0}| + \Sigma_{j=0}^{H-1} |r_{-1,j} - p_{0,j}| \qquad \text{Eq. 3}$$

A parameter $r_{m,-1}$ represents a reference sample value of the top neighboring sample $R_{m,-1}$ (1532) and a parameter $p_{m,0}$ represents a reconstructed sample value of the top reconstructed sample $P_{m,0}$ (1512) where an integer m is from 0 to W-1. W can be a width of the current block (1501), such as 8 in the example shown in FIG. 15. The top neighboring sample $R_{m,-1}$ corresponds to the top reconstructed sample $P_{m,0}$. For example, the top neighboring sample $R_{m,-1}$ is directly above the top reconstructed sample $P_{m,0}$.

A parameter $r_{-1,j}$ represents a reference sample value of the left neighboring sample $R_{-1,j}$ (1533) and a parameter $p_{0,j}$ represents a reconstructed sample value of the left reconstructed sample $P_{0,j}$ (1513) where an integer j is from 0 to H-1. H can be a height of the current block (1501), such as 4 in the example shown in FIG. 15. The left neighboring sample $R_{-1,j}$ corresponds to the left reconstructed sample $P_{0,j}$. For example, the left neighboring sample $R_{-1,j}$ is a left neighbor of the left reconstructed sample $P_{0,j}$.

The gradient cost in Eq. 3 can include a first summation over the top reconstructed samples (1512) in the top row in the current block (1501) and a second summation over the left reconstructed samples (1513) in the left-most column in the current block (1501).

In some examples, the gradient cost only incudes the first summation without the second summation. In some examples, the gradient cost only incudes the second summation without the first summation. In some examples, the gradient cost includes a summation over selected samples in the subset of samples (1511).

A piece of weight information can be determined based on the determined gradient costs that correspond to the multiple pieces of weight information. The determined piece of weight information can be used to reconstruct the current block (1501). For example, if the two reference lines are the reference lines 1 and 3, the determined piece of weight information indicates ⅘ and ⅕ for the reference lines 1 and 3, respectively. Each sample in the current block (1501) can be predicted based on Eq. 2. The first prediction $p_1$ and the second prediction $p_2$ can be determined using the intra prediction mode.

In an embodiment, a best combination of the two weights of the two reference lines is determined by calculating the gradient cost between the neighboring reconstructed samples (1531) and the reconstructed subset of samples (1511) (e.g., along the top and the left of the CU boundary). For example, the predefined weight combinations for the two reference lines are predefined in a weight list. The predefined weight combinations can correspond to the multiple pieces of weight information. Each predefined weight combination (e.g., ¾ and ¼) can be used to generate a corresponding intra predictor, for example, of the subset of samples (1511), such as described above. The residual (e.g., the decoded residual) corresponding to the intra predictor can be added to the intra predictor to form the reconstructed samples for each weight combination. For each weight combination, all gradient values between the neighboring reconstructed samples (1531) and the adjacent reconstructed samples (1511) along the top and the left CU boundary are added together as the gradient cost, such as shown in Eq. 3.

Figure 16:
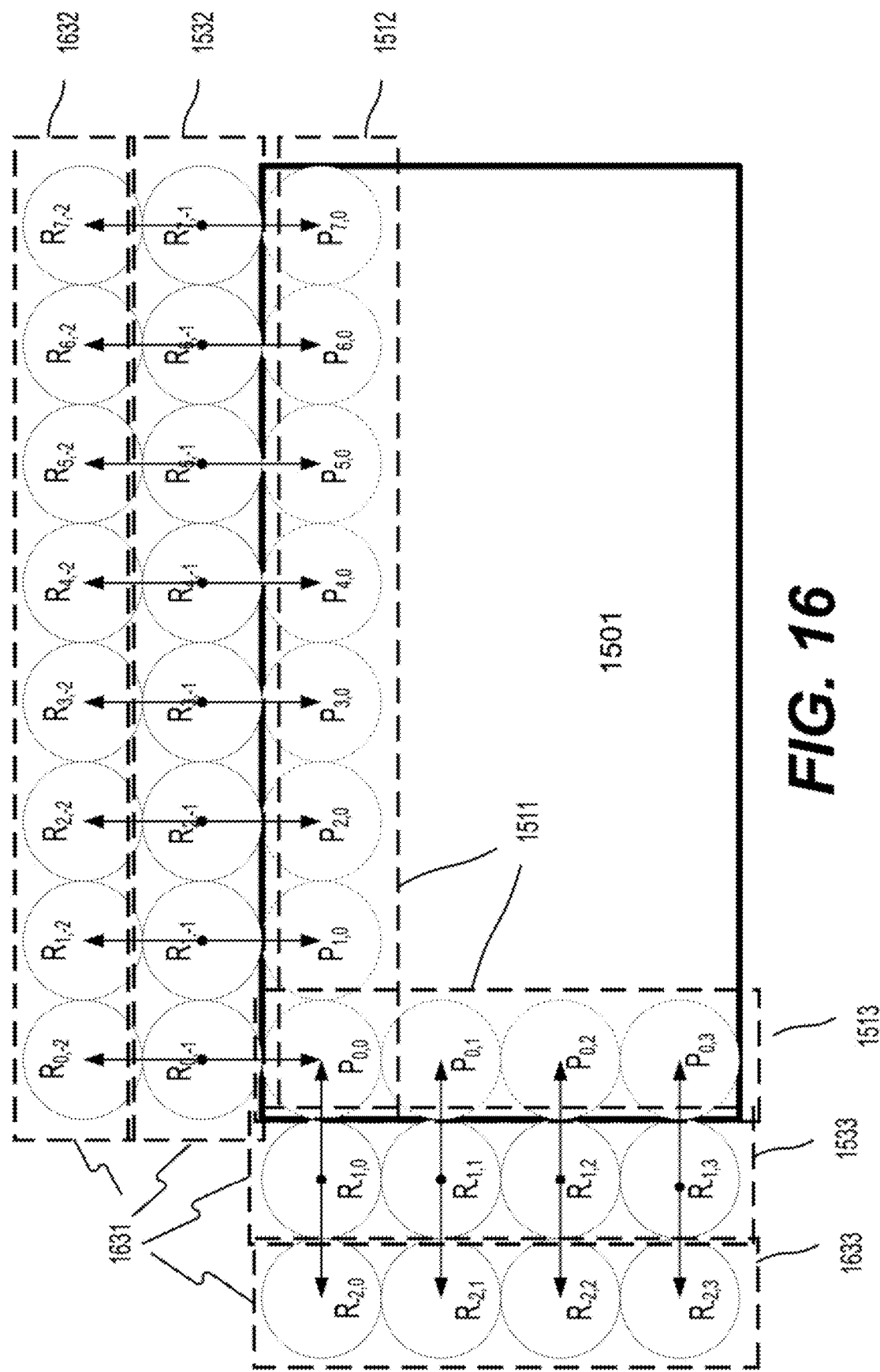
FIG. 16 shows an example of samples used to determine a gradient cost for a current block.

FIG. 16 shows another example of samples used to determine a gradient cost for the current block (1501). The subset of samples (1511), the top samples (1512), and the left samples (1513) in FIG. 16 are described in FIG. 15.

A gradient cost can be determined based on the reconstructed subset of samples (1511) in the current block and reconstructed samples (1631) outside the current block that correspond to the reconstructed subset of samples (1511). The reconstructed samples (1631) can include the neighboring reconstructed samples (1531) (e.g., (1532) and (1533)) described in FIG. 15 and additional reconstructed samples (1632) and (1633) that are not adjacent to the current block (1501). The reconstructed samples (1632) are adjacent to and above the top neighboring samples (1532). The reconstructed samples (1633) are adjacent to the left neighboring samples (1533). In the example of FIG. 16, the reconstructed samples (1632)-(1633) are reference samples of the reference line 1. In an example, the gradient cost is determined using Eq. 4.

$$\text{gradient cost} = \Sigma_{m=0}^{w-1} |2 \cdot r_{m,-1} - r_{m,-2} - p_{m,0}| + \Sigma_{j=0}^{H-1} |2 \cdot r_{-1,j} - r_{-2,j} - p_{0,j}| \quad \text{Eq. 4}$$

A parameter $r_{m,-2}$ represents a reference sample value of the reconstructed sample $R_{m,-2}$ (1632) where an integer m is from 0 to W-1. A parameter $r_{-2,j}$ represents a reference sample value of the left reconstructed sample $R_{-2,j}$ (1633) where an integer j is from 0 to H-1.

The gradient cost corresponding to each piece of weight information (e.g., a predefined weight combination) can be determined based on reconstructed samples in a current block and reconstructed samples outside the current block where the reconstructed samples in the current block are determined based on the respective piece of weight information.

In an embodiment, the piece of weight information (e.g., the weight combination) with the smallest gradient cost is selected as the best weight combination, and the selected weight combination is not signaled in a bitstream.

In an embodiment, template-matching is disabled, for example, by a high-level syntax or the template-matching is not supported, and thus the multiple pieces of weight information are not reordered based on the determined gradient costs. After the piece of weight information is selected (e.g., by an encoder) from the multiple pieces of weight information, an index indicating the selected weight combination may be signaled.

In an embodiment, the template-matching is enabled. The multiple pieces of weight information can be reordered based on the determined gradient costs, for example, in an ascending order of the determined gradient costs. An index can be signaled at a CU level to indicate which piece of weight information (e.g., which weight combination) in the reordered multiple pieces of weight information is used.

In an embodiment, the index indicating the piece of weight information (e.g., the weight combination) may be signaled at a high-level, such as a level higher than a CU level. For example, the index is signaled at a sequence level, a picture level, a slice level, or the like.

Two or more selected reference lines in an MRL buffer can be used in the intra prediction fusion. The MRL buffer can store reference sample values of reference lines. The two or more selected reference lines may not be adjacent to each other spatially. Referring to FIG. 13B, for example, the two or more selected reference lines include the reference lines 1 and 5 that are not adjacent.

Referring to FIG. 13B, in an example, a reference line in the MRL buffer with an index i and a reference line in the MRL buffer with an index (i+1) are utilized in the intra prediction fusion. In an example, i is an integer that is larger than or equal to 0. The index i and the index (i+1) are reference line indices pointing to adjacent entries in an MRL list, such as the MRL list of {1, 3, 5, 7, 12}. For example, the index i being 0, 1, 2, 3, or 4 corresponds to the reference line 1, 3, 5, 7, or 12, respectively. If the index i being 0 is signaled, the entries 0 and 1 in the MRL list of {1, 3, 5, 7, 12} are used, and thus the reference lines 1 and 3 are selected to be used the intra prediction fusion.

In an example, the MRL buffer stores the reference lines in the MRL list which include the reference lines 1 and 3, and thus no extra memory is needed to perform the intra prediction fusion. This is different from the example shown in Eq. 1. For example, in Eq. 1, the two spatially adjacent reference lines (e.g., the reference lines 1-2) are used, and thus extra memory is needed to store the reference line 2 which is not in the MRL list.

In an example, more than two reference lines are used in the intra prediction fusion. A single index i can be signaled, and reference lines having indices i, (i+1), (i+2), and the like can be used. If three reference lines are used and the index i being 0 is signaled, the reference lines 1, 3, and 5 that correspond to the indices 0-2 are selected in the intra prediction fusion. In addition, each piece of weight information indicates a weight combination for the reference lines 1, 3, and 5, such as 4/7, 2/7, and 1/7, respectively.

In an example, the reference line 1 and the reference line 3 are used in the intra prediction fusion. For example, the index i being 0 is signaled indicating the reference lines 1 and 3.

In another example, the reference line 5 and the reference line 7 are used in the intra prediction fusion. For example, the index i being 1 is signaled indicating the reference lines 5 and 7.

In another example, the reference line 7 and the reference line 12 are used in the intra prediction fusion.

In another example, the reference line 12 and the reference line 1 are used in the intra prediction fusion. For example, the index i being 4 is signaled indicating the reference lines 12 and 1. In an example, the last entry (e.g., 12) and the first entry (e.g., 1) and in the MRL list (e.g., {1, 3, 5, 7, 12}) are treated as adjacent entries.

In an embodiment, the weights applied to the selected reference lines depend on which reference lines are selected. For example, the weights applied to a combination of the reference line 1 and the reference line 3 are different from the weights applied to a combination of the reference line 1 and the reference line 5.

In an embodiment, the weights applied to the selected reference lines depend on relative distance(s) of the selected reference lines. The relative distance between two reference lines can be a number of lines (e.g., a number of rows and/or columns) between the two reference lines. For example, the relative distance between the reference line it (e.g., 1) and the reference line i2 (e.g., 3) is |i1−i2| (e.g., 2).

In an embodiment, a weight applied to a selected reference line depends on a relative distance (e.g., a number of lines) between the selected reference line and the reference line (e.g., the reference line 0) that is adjacent to the current block. For example, the relative distance between the reference line i (e.g., 1) and the reference line 0 is i (e.g., 1).

Figure 17:
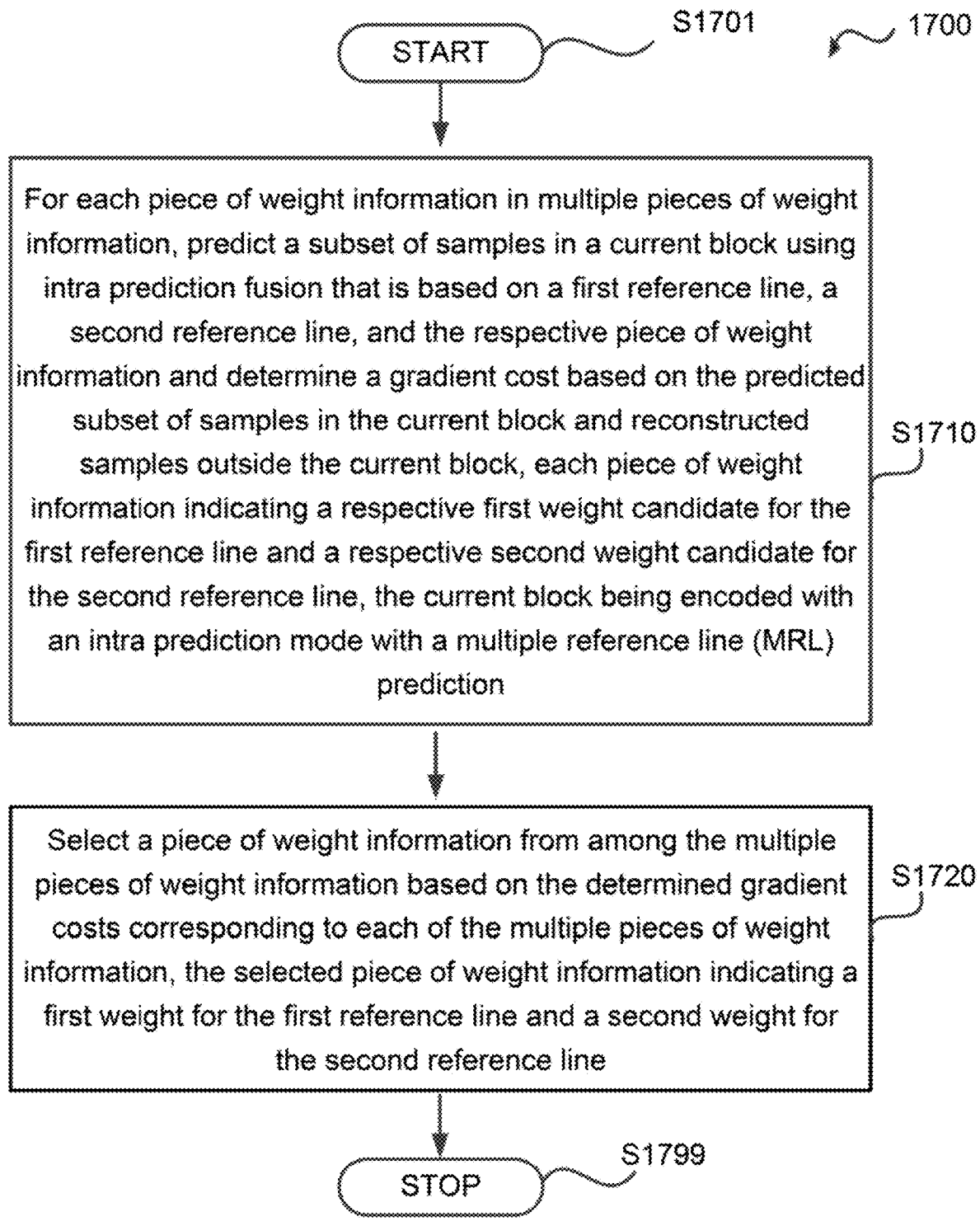
FIG. 17 shows a flow chart outlining an encoding process according to some embodiment of the disclosure.

FIG. 17 shows a flow chart outlining an encoding process (1700) according to an embodiment of the disclosure. The process (1700) can be used in a video/image encoder. The process (1700) can be executed by an apparatus for video/image coding that can include processing circuitry. In various embodiments, the process (1700) is executed by the processing circuitry, such as the processing circuitry in the terminal devices (310), (320), (330) and (340), processing circuitry that performs functions of a video encoder (e.g., (403), (603), (703)), or the like. In some embodiments, the process (1700) is implemented in software instructions, thus when the processing circuitry executes the software instructions, the processing circuitry performs the process (1700). The process starts at (S1701), and proceeds to (S1710).

At (S1710), for each piece of weight information in multiple pieces of weight information, a subset of samples in a current block can be predicted using intra prediction fusion that is based on a first reference line, a second reference line, and the respective piece of weight information. The current block can be encoded with an intra prediction mode with a multiple reference line (MRL) prediction. Each piece of weight information can indicate a respective first weight candidate for the first reference line and a respective second weight candidate for the second reference line.

In an example, the subset of samples includes at least one of (i) top samples in a top row in the current block or (ii) left samples in a left-most column in the current block.

A gradient cost can be determined based on the predicted subset of samples in the current block and reconstructed samples outside the current block for each piece of weight information. In an example, the reconstructed samples outside the current block include samples that neighbor the predicted subset of samples in the current block.

At (S1720), a piece of weight information can be selected from among the multiple pieces of weight information based on the determined gradient costs corresponding to each of the multiple pieces of weight information. The selected piece of weight information can indicate a first weight for the first reference line and a second weight for the second reference line. The current block can be encoded based on the first weight and the second weight using intra prediction fusion.

The process (1700) then proceeds to (S1799), and terminates.

The process (1700) can be suitably adapted to various scenarios and steps in the process (1700) can be adjusted accordingly. One or more of the steps in the process (1700) can be adapted, omitted, repeated, and/or combined. Any suitable order can be used to implement the process (1700). Additional step(s) can be added.

In an example, the first reference line includes first reference samples that are N1 rows or N1 columns away from the current block. The second reference line includes second reference samples that are N2 rows or N2 columns away from the current block. N1 and N2 are different integers that are larger than or equal to 0.

In an example, for each piece of weight information in the multiple pieces of weight information and for one of the subset of samples, a first prediction value is determined based on one or more first reference samples of the first reference line using the intra prediction mode. A second prediction value is determined based on one or more second reference samples of the second reference line using the intra prediction mode. The one of the subset of samples is predicted based on the first prediction value modified by the first weight, the second prediction value modified by the second weight, and a residual of the one of the subset of samples.

In an example, the subset of samples in the current block includes the top samples in the top row in the current block and the left samples in the left-most column in the current block In an example, the reconstructed samples outside the current block include reconstructed samples that are not adjacent to the predicted subset of samples.

In an example, the piece of weight information is determined to be one of the multiple pieces of weight information that corresponds to the smallest gradient cost in the determined gradient costs.

In an example, the multiple pieces of weight information are reordered based on the determined gradient costs. The piece of weight information can be determined based on the reordered multiple pieces of weight information.

In an example, an index is encoded and included in a bitstream. The index can be signaled in a high-level syntax.

Figure 18A:
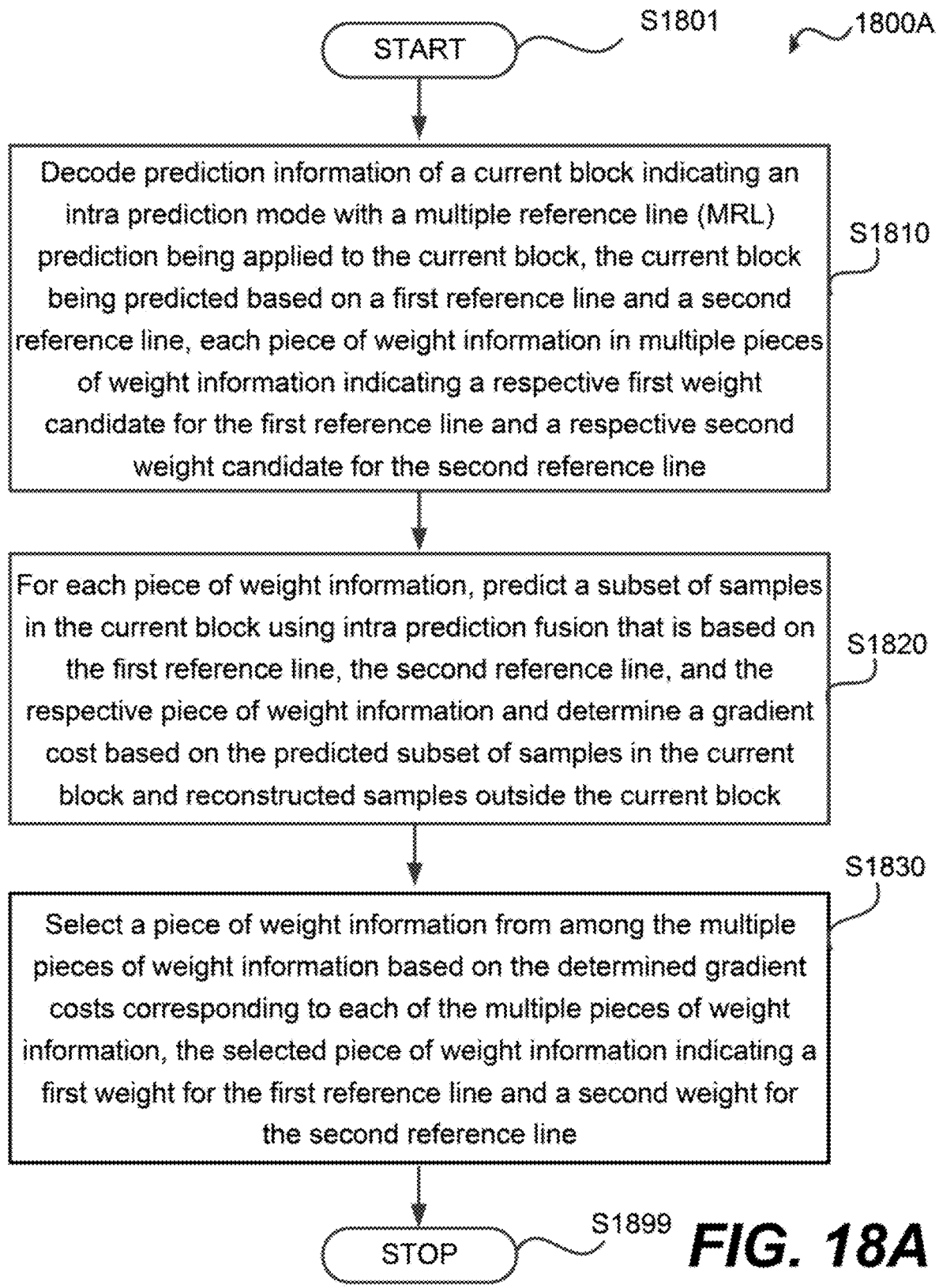
FIG. 18A shows a flow chart outlining a decoding process according to some embodiment of the disclosure.

FIG. 18A shows a flow chart outlining a decoding process (1800A) according to an embodiment of the disclosure. The process (1800A) can be used in a video/image decoder. The process (1800A) can be executed by an apparatus for video/image coding that can include receiving circuitry and processing circuitry. In various embodiments, the process (1800A) is executed by the processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1800A) is implemented in software instructions, thus when the processing circuitry executes the software instructions, the processing circuitry performs the process (1800A). The process starts at (S1801), and proceeds to (S1810).

At (S1810), prediction information of a current block in a current picture can be decoded from a coded bitstream (e.g., a coded video bitstream). The prediction information indicates an intra prediction mode with a multiple reference line (MRL) prediction being applied to the current block. The current block can be predicted based on a first reference line and a second reference line. Each piece of weight information in multiple pieces of weight information indicates a respective first weight candidate for the first reference line and a respective second weight candidate for the second reference line.

At (S1820), for each piece of weight information, a subset of samples in the current block can be predicted using intra prediction fusion that is based on the first reference line, the second reference line, and the respective piece of weight information. The subset of samples can include at least one of (i) top samples in a top row in the current block or (ii) left samples in a left-most column in the current block. A gradient cost can be determined based on the predicted subset of samples in the current block and reconstructed samples outside the current block. The reconstructed samples outside the current block can include samples that neighbor the predicted subset of samples in the current block.

At (S1830), a piece of weight information can be selected from among the multiple pieces of weight information based on the determined gradient costs corresponding to each of the multiple pieces of weight information. The selected piece of weight information indicates a first weight for the first reference line and a second weight for the second reference line.

The process (1800A) proceeds to (S1899), and terminates.

The process (1800A) can be suitably adapted to various scenarios and steps in the process (1800A) can be adjusted accordingly. One or more of the steps in the process (1800A) can be adapted, omitted, repeated, and/or combined. Any suitable order can be used to implement the process (1800A). Additional step(s) can be added.

In an example, the first reference line includes first reference samples that are N1 rows or N1 columns away from the current block. The second reference line includes second reference samples that are N2 rows or N2 columns away from the current block. N1 and N2 are different integers that are larger than or equal to 0.

In an example, for each piece of weight information in the multiple pieces of weight information and for one of the subset of samples, a first prediction value is determined based on one or more first reference samples of the first reference line using the intra prediction mode. A second prediction value is determined based on one or more second reference samples of the second reference line using the intra prediction mode. The one of the subset of samples is predicted based on the first prediction value modified by the first weight, the second prediction value modified by the second weight, and a residual of the one of the subset of samples.

In an example, the subset of samples in the current block includes the top samples in the top row in the current block and the left samples in the left-most column in the current block In an example, the reconstructed samples outside the current block include reconstructed samples that are not adjacent to the predicted subset of samples.

In an example, the piece of weight information is determined to be one of the multiple pieces of weight information that corresponds to the smallest gradient cost in the determined gradient costs.

In an example, the multiple pieces of weight information are reordered based on the determined gradient costs. The piece of weight information can be determined based on an index and the reordered multiple pieces of weight information.

In an example, the index is signaled in a high-level syntax.

Figure 18B:
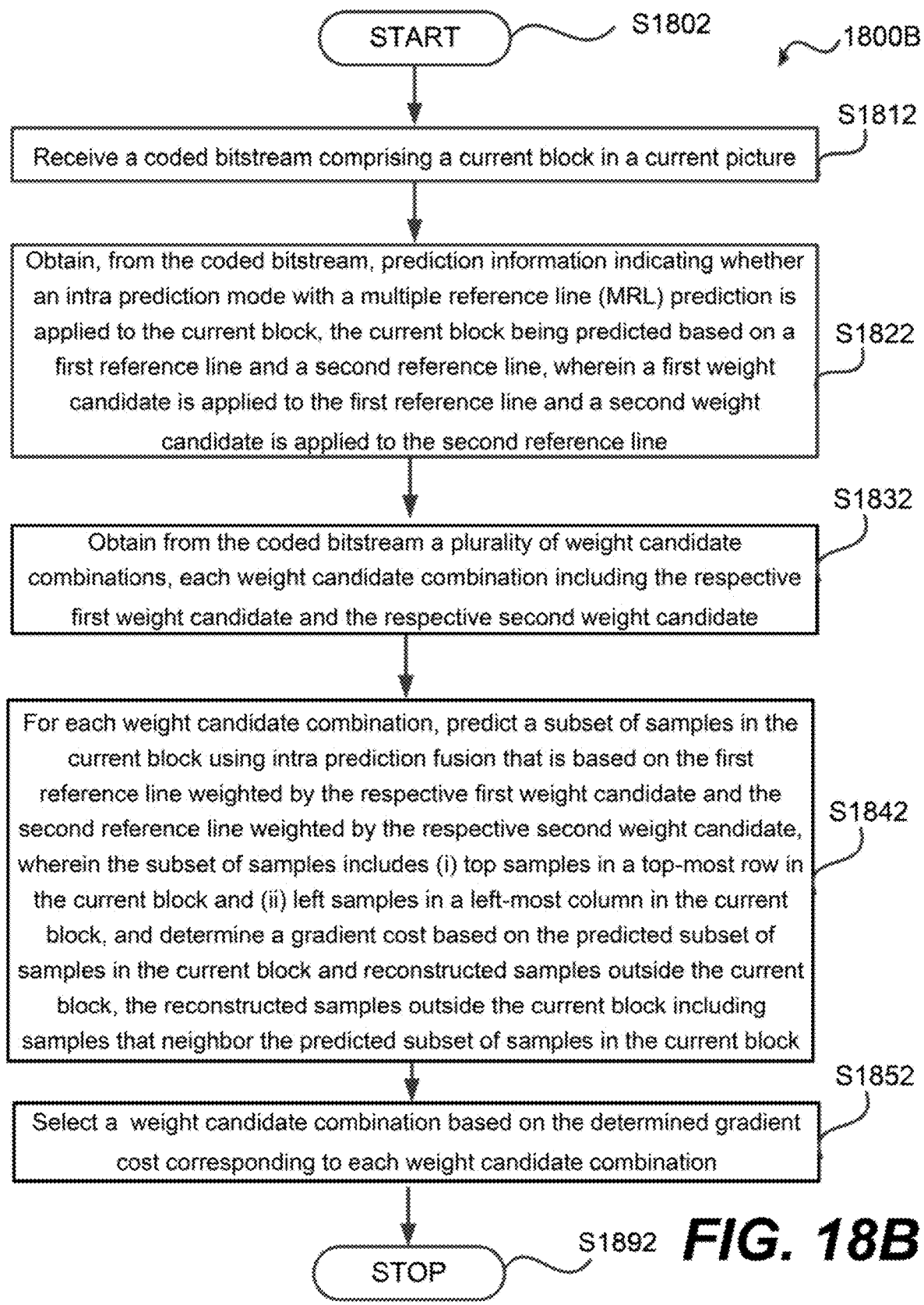
FIG. 18B shows a flow chart outlining a decoding process according to some embodiment of the disclosure.

FIG. 18B shows a flow chart outlining a decoding process (1800B) according to an embodiment of the disclosure. The process (1800B) can be used in a video/image decoder. The process (1800B) can be executed by an apparatus for video/image coding that can include receiving circuitry and processing circuitry. In various embodiments, the process (1800B) is executed by the processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1800B) is implemented in software instructions, thus when the processing circuitry executes the software instructions, the processing circuitry performs the process (1800B). The process starts at (S1802), and proceeds to (S1812).

At (S1812), a coded bitstream comprising a current block in a current picture is received.

At (S1822), from the coded bitstream, prediction information indicating whether an intra prediction mode with a multiple reference line (MRL) prediction is applied to the current block is obtained. The current block is predicted based on a first reference line and a second reference line, wherein a first weight candidate is applied to the first reference line and a second weight candidate is applied to the second reference line.

At (S1832), a plurality of weight candidate combinations is obtained from the coded bitstream. Each weight candidate combination includes a respective first weight candidate and a respective second weight candidate.

At (S1842), for each weight candidate combination, a subset of samples in the current block is predicted using intra prediction fusion that is based on the first reference line weighted by the respective first weight candidate and the second reference line weighted by the respective second weight candidate, wherein the subset of samples includes (i) top samples in a top-most row in the current block and (ii) left samples in a left-most column in the current block. For each weight candidate combination, a gradient cost is determined based on the predicted subset of samples in the current block and reconstructed samples outside the current block. The reconstructed samples outside the current block include samples that neighbor the predicted subset of samples in the current block.

At (S1852), a weight candidate combination is selected based on the determined gradient cost corresponding to each weight candidate combination.

The process (1800B) proceeds to (S1892), and terminates.

The process (1800B) can be suitably adapted to various scenarios and steps in the process (1800B) can be adjusted accordingly. One or more of the steps in the process (1800B) can be adapted, omitted, repeated, and/or combined. Any suitable order can be used to implement the process (1800B). Additional step(s) can be added.

Figure 19:
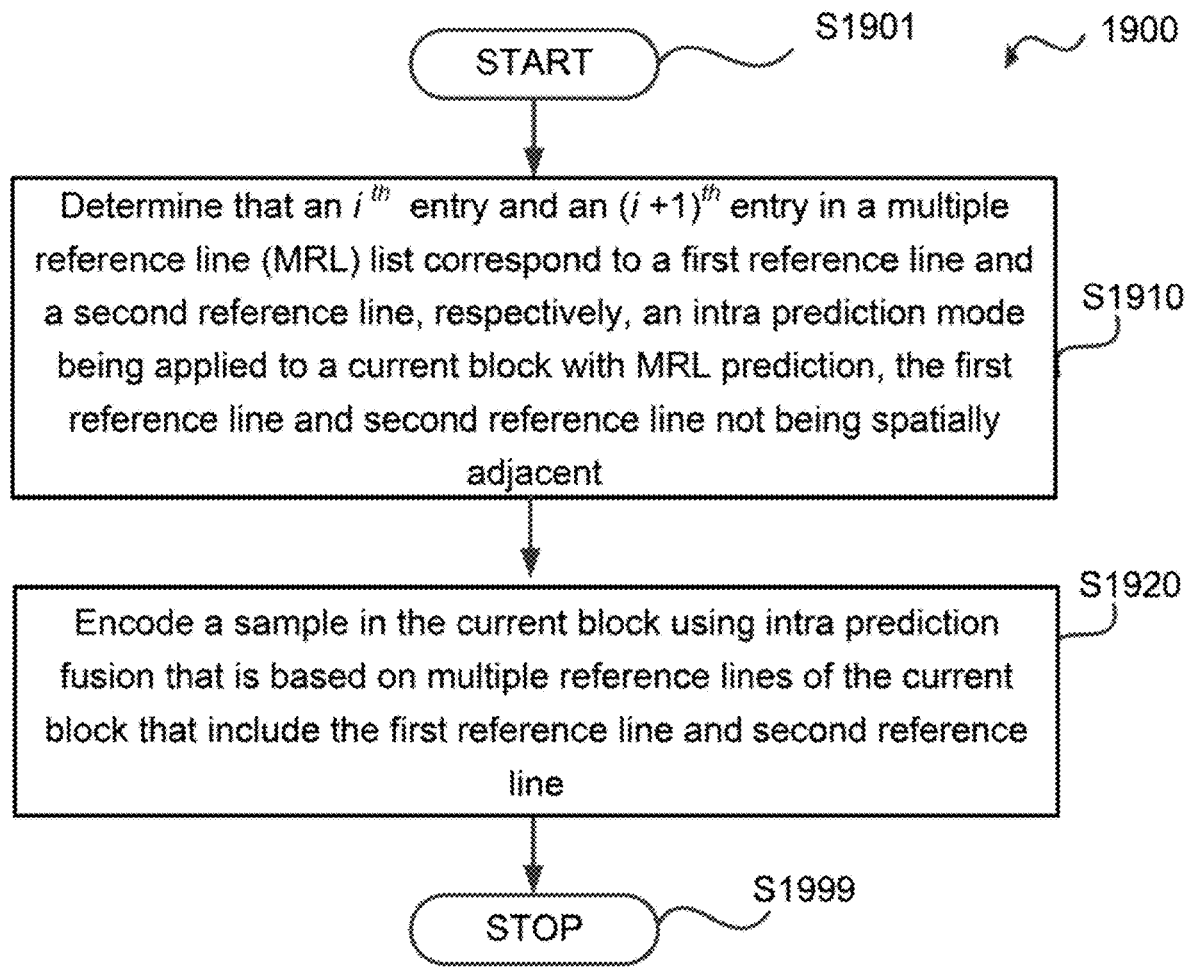
FIG. 19 shows a flow chart outlining an encoding process according to some embodiment of the disclosure.

FIG. 19 shows a flow chart outlining an encoding process (1900) according to an embodiment of the disclosure. The process (1900) can be used in a video/image encoder. The process (1900) can be executed by an apparatus for video/image coding that can include processing circuitry. In various embodiments, the process (1900) is executed by the processing circuitry, such as the processing circuitry in the terminal devices (310), (320), (330) and (340), processing circuitry that performs functions of a video encoder (e.g., (403), (603), (703)), or the like. In some embodiments, the process (1900) is implemented in software instructions, thus when the processing circuitry executes the software instructions, the processing circuitry performs the process (1900). The process starts at (S1901), and proceeds to (S1910).

At (S1910), an intra prediction mode is applied to a current block with multiple reference line (MRL) prediction. An $i^{th}$ entry and an $(i+1)^{th}$ entry in an MRL list correspond to a first reference line and a second reference line, respectively. For example, if i is 1, the first entry and the second entry in an MRL list correspond to the first reference line and the second reference line, respectively. In an example, the first reference line and second reference line are not spatially adjacent.

At (S1920), a sample in the current block is encoded using intra prediction fusion that is based on multiple reference lines of the current block. The multiple reference lines include the first reference line and second reference line.

The process (1900) then proceeds to (S1999), and terminates.

The process (1900) can be suitably adapted to various scenarios and steps in the process (1900) can be adjusted accordingly. One or more of the steps in the process (1900) can be adapted, omitted, repeated, and/or combined. Any suitable order can be used to implement the process (1900). Additional step(s) can be added.

In an example, a first prediction value is determined based on one or more first reference samples in the first reference line using the intra prediction mode. A second prediction value is determined based on one or more second reference samples in the second reference line using the intra prediction mode. The sample can be predicted based on a weighted average of the first prediction value and the second prediction value.

In an example, a residual of the sample is determined based on a value of the sample and a value of the predicted sample. The residual of the sample can be encoded and included in a bitstream.

In an example, the MRL list is {1, 3, 5, 7, 12} corresponding to reference lines 1, 3, 5, 7, and 12, respectively. Each of the reference lines 1, 3, 5, 7, and 12 is 1, 3, 5, 7, and 12 rows and/or columns away from the current block, respectively. The MRL index i being 0, 2, 3, or 4 corresponds to the reference line 1, 5, 7, or 12, respectively. If the MRL index i is 0, the first reference line and the second reference line are the reference lines 1 and 3. If the MRL index i is 2, the first reference line and the second reference line are the reference lines 5 and 7. If the MRL index i is 3, the first reference line and the second reference line are the reference lines 7 and 12. If the MRL index i is 4, the first reference line and the second reference line are the reference lines 12 and 1.

In an example, a first weight associated with the first reference line and a second weight associated with the second reference line depend on the first reference line and the second reference line. The sample in the current block can be predicted based on the first reference line, the second reference line, the first weight, and the second weight.

In an example, a first weight associated with the first reference line and a second weight associated with the second reference line depend on a distance between the first reference line and the second reference line. The distance can be a number of rows and/or columns between the first reference line and the second reference line.

In an example, a first weight associated with the first reference line depends on a distance between the first reference line and a reference line 0 that is adjacent to the current block. The distance is proportional to the MRL index i.

Figure 20:
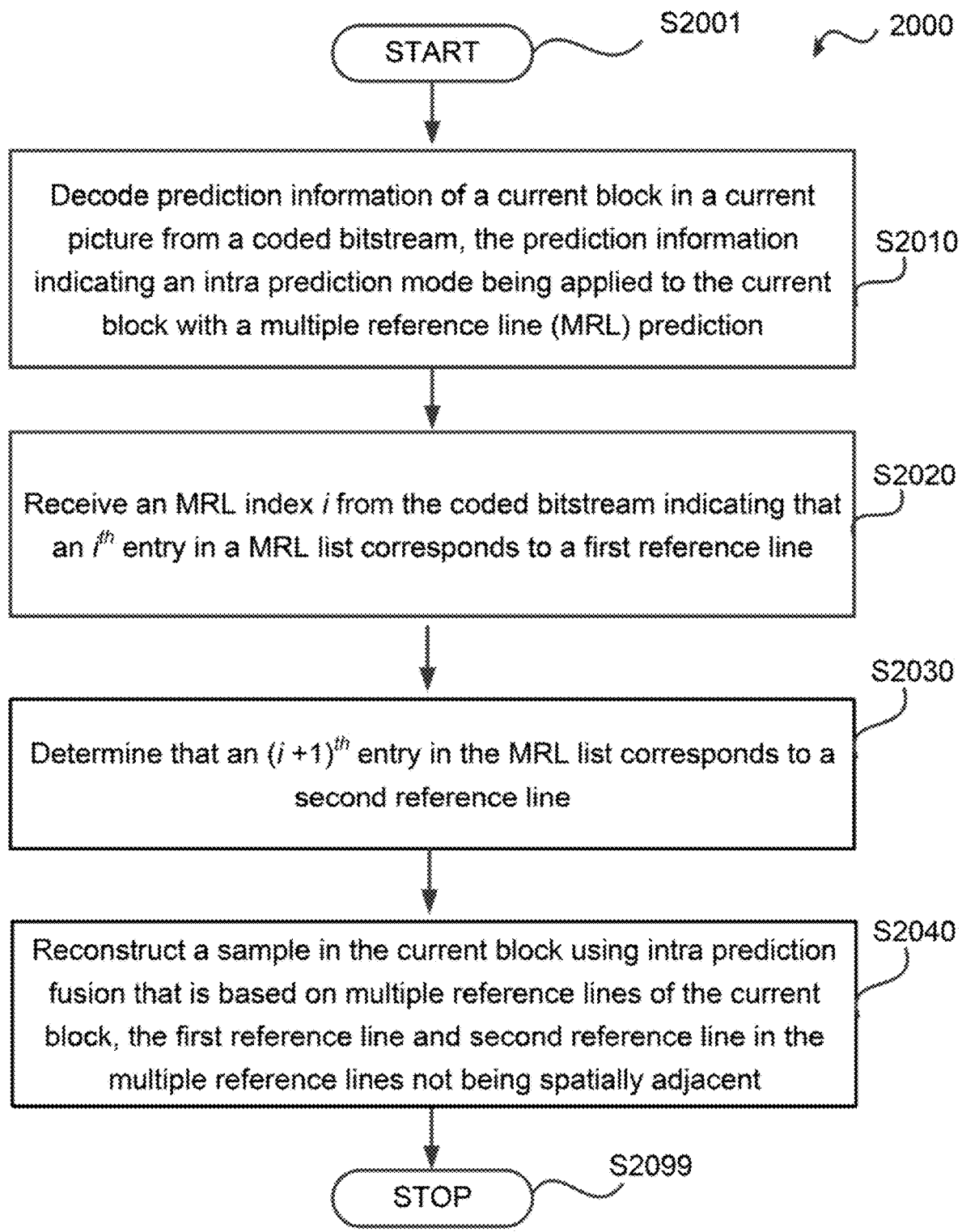
FIG. 20 shows a flow chart outlining a decoding process according to some embodiment of the disclosure.

FIG. 20 shows a flow chart outlining a decoding process (2000) according to an embodiment of the disclosure. The process (2000) can be used in a video/image decoder. The process (2000) can be executed by an apparatus for video/image coding that can include receiving circuitry and processing circuitry. In various embodiments, the process (2000) is executed by the processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2000) is implemented in software instructions, thus when the processing circuitry executes the software instructions, the processing circuitry performs the process (2000). The process starts at (S2001), and proceeds to (S2010).

At (S2010), prediction information of a current block in a current picture can be decoded from a coded bitstream. The prediction information indicates that an intra prediction mode is applied to the current block with a multiple reference line (MRL) prediction.

At (S2020), an MRL index i is received from the coded bitstream indicating that an ith entry in a MRL list corresponds to a first reference line.

At (S2030), an (i+1)th entry in the MRL list can be determined to correspond to a second reference line.

At (S2040), a sample in the current block can be reconstructed using intra prediction fusion that is based on multiple reference lines of the current block, the first reference line and second reference line in the multiple reference lines not being spatially adjacent.

The process (2000) proceeds to (S2099), and terminates.

The process (2000) can be suitably adapted to various scenarios and steps in the process (2000) can be adjusted accordingly. One or more of the steps in the process (2000) can be adapted, omitted, repeated, and/or combined. Any suitable order can be used to implement the process (2000). Additional step(s) can be added.

In an example, a first prediction value is determined based on one or more first reference samples in the first reference line using the intra prediction mode. A second prediction value is determined based on one or more second reference samples in the second reference line using the intra prediction mode. The sample can be predicted based on a weighted average of the first prediction value and the second prediction value.

In an example, the sample is reconstructed based on the predicted sample and a residual of the sample.

In an example, the MRL list is {1, 3, 5, 7, 12} corresponding to reference lines 1, 3, 5, 7, and 12, respectively. Each of the reference lines 1, 3, 5, 7, and 12 is 1, 3, 5, 7, and 12 rows and/or columns away from the current block, respectively. The MRL index i being 0, 2, 3, or 4 corresponds to the reference line 1, 5, 7, or 12, respectively. If the MRL index i is 0, the first reference line and the second reference line are the reference lines 1 and 3. If the MRL index i is 2, the first reference line and the second reference line are the reference lines 5 and 7. If the MRL index i is 3, the first reference line and the second reference line are the reference lines 7 and 12. If the MRL index i is 4, the first reference line and the second reference line are the reference lines 12 and 1.

In an example, a first weight associated with the first reference line and a second weight associated with the second reference line depend on the first reference line and the second reference line. The sample in the current block can be reconstructed based on the first reference line, the second reference line, the first weight, and the second weight.

In an example, a first weight associated with the first reference line and a second weight associated with the second reference line depend on a distance between the first reference line and the second reference line. The distance can be a number of rows and/or columns between the first reference line and the second reference line.

In an example, a first weight associated with the first reference line depends on a distance between the first reference line and a reference line 0 that is adjacent to the current block. The distance is proportional to the MRL index i.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
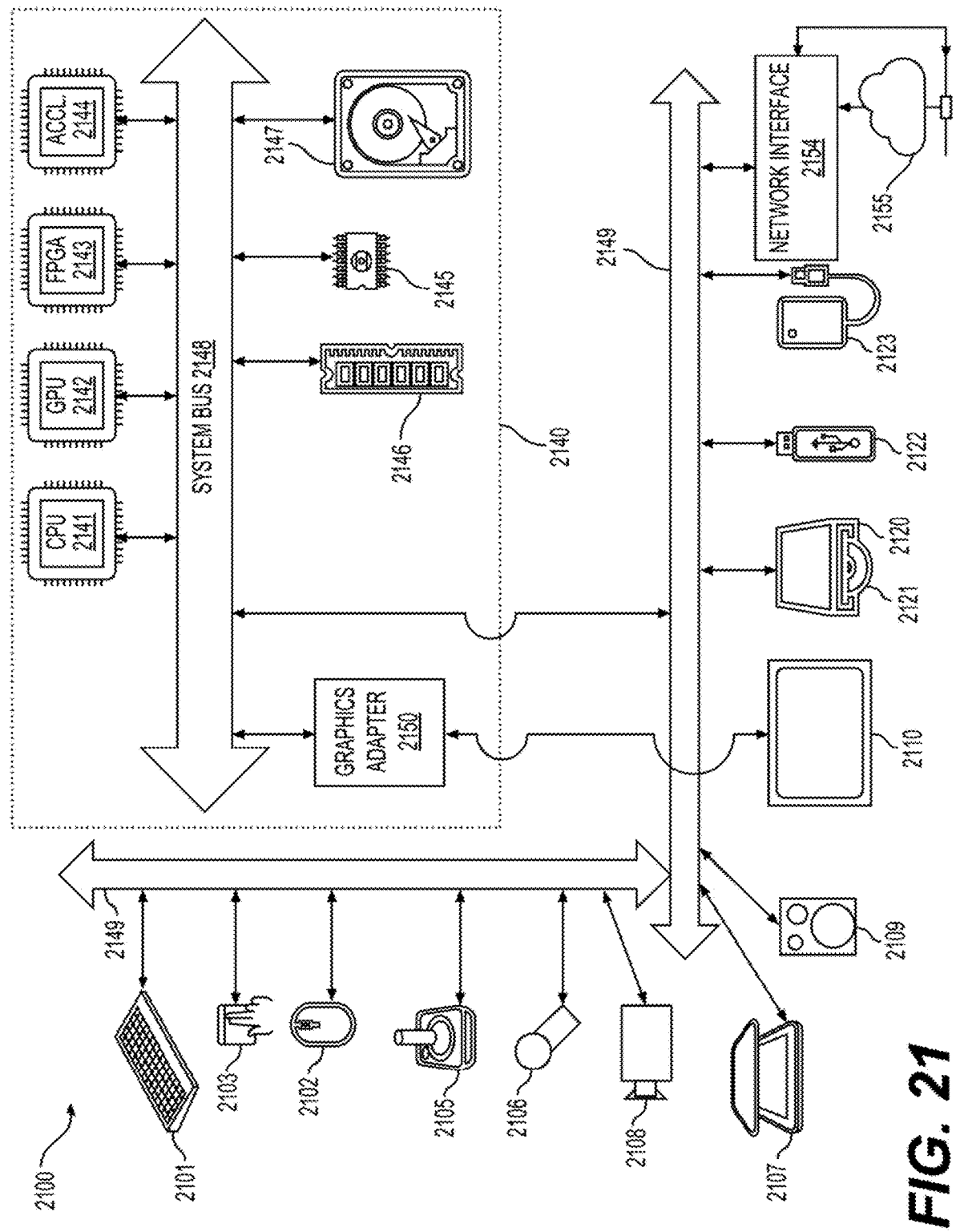
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators (2144) for certain tasks, graphics adapters (2150), and so forth. These devices, along with Read-only memory (ROM) (2145), Random-access memory (2146), internal mass storage (2147) such as internal non-user accessible hard drives, SSDs, and the like, may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (2100) having architecture, and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
  JEM: joint exploration model
  VVC: versatile video coding
  BMS: benchmark set
  MV: Motion Vector
  HEVC: High Efficiency Video Coding
  SEI: Supplementary Enhancement Information
  VUI: Video Usability Information
  GOPs: Groups of Pictures
  TUs: Transform Units,
  PUs: Prediction Units
  CTUs: Coding Tree Units
  CTBs: Coding Tree Blocks
  PBs: Prediction Blocks
  HRD: Hypothetical Reference Decoder
  SNR: Signal Noise Ratio
  CPUs: Central Processing Units
  GPUs: Graphics Processing Units
  CRT: Cathode Ray Tube
  LCD: Liquid-Crystal Display
  OLED: Organic Light-Emitting Diode
  CD: Compact Disc
  DVD: Digital Video Disc
  ROM: Read-Only Memory
  RAM: Random Access Memory
  ASIC: Application-Specific Integrated Circuit
  PLD: Programmable Logic Device
  LAN: Local Area Network
  GSM: Global System for Mobile communications
  LTE: Long-Term Evolution
  CANBus: Controller Area Network Bus
  USB: Universal Serial Bus
  PCI: Peripheral Component Interconnect
  FPGA: Field Programmable Gate Areas
  SSD: solid-state drive
  IC: Integrated Circuit
  CU: Coding Unit
  JVET: Joint Video Exploration Team
  AMVR: Adaptive Motion Vector Resolution
  POC: Picture Order Count
  SbTMVP: Subblock-based temporal motion vector prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a decoder, comprising:
  receiving a coded bitstream comprising a current block in a current picture;
  obtaining, from the coded bitstream, prediction information indicating that an intra prediction mode with a multiple reference line (MRL) prediction is applied to the current block, the current block being predicted based on a first reference line and a second reference line, wherein a first weight candidate is applied to the first reference line and a second weight candidate is applied to the second reference line and the first reference line and the second reference line are different;

obtaining from the coded bitstream a plurality of weight candidate combinations, each weight candidate combination including a respective first weight candidate and a respective second weight candidate;

for each weight candidate combination,
predicting a subset of samples in the current block using intra prediction fusion that is based on the first reference line weighted by the respective first weight candidate and the second reference line weighted by the respective second weight candidate, wherein the subset of samples includes (i) top samples in a top-most row in the current block and (ii) left samples in a left-most column in the current block; and determining a gradient cost based on the predicted subset of samples in the current block and reconstructed samples outside the current block, the reconstructed samples outside the current block including samples that neighbor the predicted subset of samples in the current block; and selecting a weight candidate combination based on the determined gradient cost corresponding to each weight candidate combination.

2. The method of claim 1, wherein:
the first reference line includes first reference samples that are N1 rows or N1 columns away from the current block;
the second reference line includes second reference samples that are N2 rows or N2 columns away from the current block; and
N1 and N2 are different integers that are larger than or equal to 0.

3. The method of claim 1, wherein the predicting the subset of samples comprises:
for each weight candidate combination in the plurality of weight candidate combinations and for one of the subset of samples,
determining a first prediction value based on one or more first reference samples of the first reference line using the intra prediction mode;
determining a second prediction value based on one or more second reference samples of the second reference line using the intra prediction mode; and
predicting the one of the subset of samples based on the first prediction value modified by the first weight candidate, the second prediction value modified by the second weight candidate, and a residual of the one of the subset of samples.

4. The method of claim 3, wherein
the reconstructed samples outside the current block include reconstructed samples that are not adjacent to the predicted subset of samples.

5. The method of claim 1, wherein the selecting the weight candidate combination comprises:
selecting the weight candidate combination to be one of the plurality of weight candidate combinations that corresponds to the smallest gradient cost in the determined gradient costs.

6. The method of claim 1, wherein the selecting the weight candidate combination comprises:
reordering the plurality of weight candidate combinations based on the determined gradient costs; and
determining the weight candidate combination based on an index and the reordered plurality of weight candidate combinations.

7. The method of claim 6, wherein
the index is signaled in a high-level syntax.

8. A method of video decoding in a decoder, comprising:
decoding prediction information of a current block in a current picture from a coded bitstream, the prediction information indicating an intra prediction mode being applied to the current block with a multiple reference line (MRL) prediction;
receiving an MRL index i from the coded bitstream indicating that an $i^{th}$ entry in a MRL list corresponds to a first reference line;
determining that an $(i+1)^{th}$ entry in the MRL list corresponds to a second reference line; and
reconstructing a sample in the current block using intra prediction fusion that is based on multiple reference lines of the current block, the first reference line corresponding to the $i^{th}$ entry in the MRL list and the second reference line corresponding to the $(i+1)^{th}$ entry in the MRL list, the first reference line and the second reference line not being spatially adjacent.

9. The method of claim 8, wherein the reconstructing the sample comprises:
determining a first prediction value based on one or more first reference samples in the first reference line using the intra prediction mode;
determining a second prediction value based on one or more second reference samples in the second reference line using the intra prediction mode; and
predicting the sample based on a weighted average of the first prediction value and the second prediction value.

10. The method of claim 8, wherein the reconstructing the sample comprises:
reconstructing the sample based on the predicted sample and a residual of the sample.

11. The method of claim 9, wherein
the MRL list is {1, 3, 5, 7, 12} corresponding to reference lines 1, 3, 5, 7, and 12, respectively, each of the reference lines 1, 3, 5, 7, and 12 being 1, 3, 5, 7, and 12 rows and/or columns away from the current block, respectively;
the MRL index i being 0, 2, 3, or 4 corresponds to the reference line 1, 5, 7, or 12, respectively;
in response to the MRL index i being 0, the first reference line and the second reference line are the reference lines 1 and 3;
in response to the MRL index i being 2, the first reference line and the second reference line are the reference lines 5 and 7;
in response to the MRL index i being 3, the first reference line and the second reference line are the reference lines 7 and 12; and
in response to the MRL index i being 4, the first reference line and the second reference line are the reference lines 12 and 1.

12. The method of claim 8, wherein
a first weight associated with the first reference line and a second weight associated with the second reference line depend on the first reference line and the second reference line; and the reconstructing the sample includes reconstructing the sample in the current block based on the first reference line, the second reference line, the first weight, and the second weight.

13. The method of claim 8, wherein
a first weight associated with the first reference line and a second weight associated with the second reference line depend on a distance between the first reference line and the second reference line, the distance being a number of rows and/or columns between the first reference line and the second reference line.

14. The method of claim 8, wherein a first weight associated with the first reference line depends on a distance between the first reference line and a reference line 0 that is adjacent to the current block, the distance being proportional to the MRL index i.

15. A method of video encoding, comprising:
encoding prediction information indicating that an intra prediction mode with multiple reference line (MRL) prediction is applied to a current block in a current picture, the current block being predicted based on a first reference line and a second reference line that is different from the first reference line, a first weight candidate being applied to the first reference line, a second weight candidate being applied to the second reference line, each weight candidate combination in a plurality of weight candidate combinations including a respective first weight candidate and a respective second weight candidate, wherein
for each weight candidate combination in the plurality of weight candidate combinations,
    a subset of samples in the current block is predicted using intra prediction fusion that is based on the first reference line weighted by the respective first weight candidate and the second reference line weighted by the respective second weight candidate, the subset of samples including (i) top samples in a top-most row in the current block and (ii) left samples in a left-most column in the current block; and
    a gradient cost is determined based on the predicted subset of samples in the current block and reconstructed samples outside the current block, the reconstructed samples outside the current block including samples that neighbor the predicted subset of samples in the current block; and
a weight candidate combination is selected based on the determined gradient cost corresponding to each weight candidate combination.

16. The method of claim 15, wherein:
the first reference line includes first reference samples that are N1 rows or N1 columns away from the current block;
the second reference line includes second reference samples that are N2 rows or N2 columns away from the current block; and
N1 and N2 are different integers that are larger than or equal to 0.

17. The method of claim 15, wherein the subset of samples is predicted by
for each weight candidate combination in the plurality of weight candidate combinations and for one of the subset of samples,
    determining a first prediction value based on one or more first reference samples of the first reference line using the intra prediction mode;
    determining a second prediction value based on one or more second reference samples of the second reference line using the intra prediction mode; and
    predicting the one of the subset of samples based on the first prediction value modified by the first weight candidate, the second prediction value modified by the second weight candidate, and a residual of the one of the subset of samples.

18. The method of claim 17, wherein the reconstructed samples outside the current block include reconstructed samples that are not adjacent to the predicted subset of samples.

19. The method of claim 15, wherein the weight candidate combination is selected to be one of the plurality of weight candidate combinations that corresponds to the smallest gradient cost in the determined gradient costs.

20. The method of claim 15, wherein the weight candidate combination is selected by
reordering the plurality of weight candidate combinations based on the determined gradient costs; and
determining the weight candidate combination based on an index and the reordered plurality of weight candidate combinations.

* * * * *